US009268504B2

(12) United States Patent
Hadano et al.

(10) Patent No.: US 9,268,504 B2
(45) Date of Patent: Feb. 23, 2016

(54) INFORMATION PROCESSING DEVICE, IMAGE FORMING DEVICE, PRINTING SYSTEM CONTROL METHOD, AND STORAGE MEDIUM FOR SEARCHING, RETRIEVING IMAGE FORMING DEVICES THAT ARE COLLECTIVELY REGISTERED ON A SERVICE PROVIDING DEVICE

(71) Applicant: CANON KABUSHIKI KAISHA, Tokyo (JP)

(72) Inventors: Masahiro Hadano, Yokohama (JP); Tomohiro Ishihara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 219 days.

(21) Appl. No.: 14/009,323

(22) PCT Filed: Jul. 19, 2013

(86) PCT No.: PCT/JP2013/004421
§ 371 (c)(1),
(2) Date: Oct. 1, 2013

(87) PCT Pub. No.: WO2014/017058
PCT Pub. Date: Jan. 30, 2014

(65) Prior Publication Data
US 2015/0317108 A1    Nov. 5, 2015

(30) Foreign Application Priority Data
Jul. 24, 2012   (JP) ................................. 2012-164027

(51) Int. Cl.
*G06F 3/12*   (2006.01)
*G06K 15/00*   (2006.01)

(52) U.S. Cl.
CPC ............ *G06F 3/1203* (2013.01); *G06F 3/1226* (2013.01); *G06F 3/1231* (2013.01); *G06F 3/1285* (2013.01); *G06F 3/1287* (2013.01); *G06F 3/1288* (2013.01); *G06F 3/1289* (2013.01)

(58) Field of Classification Search
CPC .............................. G06F 3/1231; G06F 3/1285
USPC ............... 358/1.1, 1.9, 1.13, 1.14, 1.15, 1.18, 358/402; 709/201, 203, 217, 221
See application file for complete search history.

(56) References Cited

U.S. PATENT DOCUMENTS 8,402,272 B2   3/2013   Zhang
8,605,318 B2   12/2013   Ikeda
(Continued)

FOREIGN PATENT DOCUMENTS

JP   2010-160579   7/2010
JP   2010-287105   12/2010
(Continued)

OTHER PUBLICATIONS

Google Developers Service Interface, (available at: https://developers.google.com/cloud-print/docs/proxyinterfaces?hl=ia, downloaded Sep. 30, 2013), updated Jun. 19, 2012.
(Continued)

*Primary Examiner* — Gabriel Garcia
(74) *Attorney, Agent, or Firm* — Fitzpatrick, Cella, Harper & Scinto

(57) ABSTRACT

An information processing device transmits, to a plurality of image forming devices, a registration request to the service providing device, and receives location information for accessing the service providing device corresponding to each the image forming device from among the plurality of image forming devices that have received the registration request, accesses the service providing device on the basis of the received location information, and receives and displays an authentication screen for inputting authentication information. After authentication information has been input on the displayed screen, a user corresponding to the authentication information and the plurality of image forming devices are associated with each other and managed by the service providing device.

11 Claims, 33 Drawing Sheets

(56) References Cited

U.S. PATENT DOCUMENTS

| | | | |
|---|---|---|---|
| 8,947,714 B2* | 2/2015 | Ishihara | G06F 3/1224 358/1.15 |
| 2002/0054345 A1* | 5/2002 | Tomida | G06F 3/1206 358/1.15 |
| 2010/0171973 A1 | 7/2010 | Kimura | |
| 2012/0218599 A1* | 8/2012 | Kashioka | G06F 3/1222 358/1.15 |
| 2014/0376035 A1* | 12/2014 | Niimura | G06F 3/1203 358/1.15 |

FOREIGN PATENT DOCUMENTS

| | | |
|---|---|---|
| JP | 2011-164854 | 8/2011 |
| JP | 2012-48581 | 3/2012 |
| WO | 2011/010432 | 1/2011 |

OTHER PUBLICATIONS

Japanese Office Action issued Oct. 20, 2015 during prosecution of related Japanese application No. 2012-164027.

* cited by examiner

Fig. 4A

| Printer name | PID | Capabilities | Printer IP Address | User account | Password |
|---|---|---|---|---|---|
| Printer A | P-001 | p-capa001 | 172.24.XXX.XXX | User 1 | ababab |
| Printer B | P-002 | p-capa002 | 172.24.YYY.YYY | User 1 | ababab |
| Printer C | P-003 | p-capa003 | 172.24.ZZZ.ZZZ | User 2 | efefef |

| Printer name | PID | Printer IP Address | Capabilities | User account | Password | Group ID |
|---|---|---|---|---|---|---|
| Printer A | P-001 | 172.24.XXX.XXX | p-capa001 | User 1 | ababab | Group1 |
| Printer B | P-002 | 172.24.YYY.YYY | p-capa002 | User 1 | ababab | Group1 |
| Printer C | P-003 | 172.24.ZZZ.ZZZ | p-capa003 | User 2 | efefef | Group2 |

Fig. 13

```
<Response>
    <PrinterName>
        <Item>Printer A</Item>
    </PrinterName>
    <PID>
        <Item>P-001</Item>
    </PID>
    <PrinterIP>
        <Item>172.24.XXX.XXX</Item>
    </PrinterIP>
    <Capabilities>
     :
    </Capavilities>
 :
</Response>
```

Fig. 18A

| | 1401 | 1402 | 1403 | 1404 |
|---|---|---|---|---|
| | Printer name | PID | Capabilities | Printer IP Address |
| | Printer A | P-001 | p-capa001 | 172.24.XXX.XXX |
| | Printer B | P-002 | p-capa002 | 172.24.YYY.YYY |

Fig. 18B

| Printer name | PID | Capabilities | Printer IP Address | User Authentication URL |
|---|---|---|---|---|
| Printer A | P-001 | p-capa001 | 172.24.XXX.XXX | Http://printservicexxx.xx/register-printerA/xxx |
| Printer B | P-002 | p-capa002 | 172.24.YYY.YYY | Http://printservicexxx.xx/register-printerB/xxx |

| Printer name | PID | Capabilities | Printer IP Address | Group ID |
|---|---|---|---|---|
| Printer A | P-001 | p-capa001 | 172.24.XXX.XXX | Group1 |
| Printer B | P-002 | p-capa002 | 172.24.YYY.YYY | Group1 |

Fig. 22C

Http://172.24.XXX.XXX/Select

Select and Register Printers on Print Service

| | Printer name | IP address |
|---|---|---|
| ☑ | Printer A | 172.24.XXX.XXX |
| ☑ | Printer B | 172.24.YYY.YYY |
| ☐ | Printer C | 172.24.ZZZ.ZZZ |

1707

Register   Cancel 1708   1709

INFORMATION PROCESSING DEVICE, IMAGE FORMING DEVICE, PRINTING SYSTEM CONTROL METHOD, AND STORAGE MEDIUM FOR SEARCHING, RETRIEVING IMAGE FORMING DEVICES THAT ARE COLLECTIVELY REGISTERED ON A SERVICE PROVIDING DEVICE

This application is a national stage application under 35 U.S.C. §371 of International Application No. PCT/JP2013/004421, having an International filing date of Jul. 19, 2013, which claims priority to Japan 2012-164027, filed on Jul. 24, 2012, the contents of each of which are incorporated by reference as if set forth in full herein.

TECHNICAL FIELD

The present invention relates to a service providing device, a printing system control method, and a storage medium.

BACKGROUND ART

A printing system has been proposed in which a print instruction is transmitted from a client to a Web server, and the Web server that has received the print instruction converts contents for printing to print data. A configuration in which the Web server provides a client with a Web service has been conventionally proposed. In recent years, cloud computing has also attracted attention as a configuration for providing a service from a web server to a client. A main feature of cloud computing is that data conversion and data processing are executed in a distributed manner using many computing resources so as to process requests from many clients in a simultaneous manner. At present, vendors provide various types of services in a disorganized manner by implementing web services in a cloud computing environment to realize cloud computing.

For example, Google (registered trademark) has developed a mechanism for data communication designed to provide services in conjunction with image forming devices, and has publicly disclosed interfaces designed for image forming devices to conduct data communication in a cloud computing environment prepared by Google (registered trademark). By implementing this interface in image forming devices, it is possible for a client to designate an image forming device to perform printing, even if the image forming device and the server are connected via the Internet.

In order to utilize the aforementioned Web server (hereinafter referred to as a "service providing device"), a user who is a client needs to acquire an account of the service providing device, and to register a printer. Firstly, the user causes an image forming device to connect to and communicate with a service providing device via a network. The user who registers the image forming device directly operates an operation unit of the image forming device or remotely operates the operation unit by using a information processing apparatus such as mobile phone through a network so as to initiate printer registration processing. Alternatively, the user can use an application for registration that has been prepared by respective venders. For example, a printing system disclosed in Japanese Patent Application Laid-open No. 2010-160579 receives a request, from a information processing apparatus, for registering an image forming device on a service providing device, and transmits, to the information processing apparatus, configuration information for the image forming device and access information for accessing the service providing device. Then the service providing device executes printer registration by associating the configuration information for the image forming device transmitted from the information processing apparatus to the service providing device on the basis of the access information with the user information. As an another example, assume an information processing device having a configuration in which a user utilizes an application for a printer registration that is provided by a vendor so as to register an image forming device from the information processing device on the service providing device through a network. In this environment, the user first activates the application for the printer registration on a screen provided in the information processing device. The user issues instructions about the printer registration to the service providing device by using the printer registration screen displayed by the activated application. By this instruction, the application issues instructions about a registration request to the service providing device to the image forming device to be registered, and the image forming device to be registered accesses the service providing device. The service providing device that has been accessed by the image forming device transmits a login screen for logging into the service providing device to the login screen. When the user inputs account information and the like on the login screen and a login has been successful in the service providing device, the printer registration is executed by associating the image forming device that has accessed with the information processing apparatus.

CITATION LIST

Patent Literature

Patent Document 1: Japanese Patent Application Laid-Open No. 2010-160579

Non Patent Literature

Non-Patent Document 1: Google Developers Service Interface (https://developers.google.com/cloud-print/docs/proxyinterfaces?hl=ja)

In a printing system or a printer registration method using the printer registration application disclosed in Japanese Patent Application Laid-open No. 2010-160579, when the user registers a plurality of image forming devices to the print service, a user needs to register the image forming devices on the service providing device one by one and repeat the registration depending on the number of the image forming devices. For example, in an enterprise environment, in the case where there are many image forming devices available on a network, the user consumes much time for printer registration work and should constantly attend to registration leaks.

SUMMARY OF INVENTION

The information processing device of the present invention provides a configuration in which a plurality of image forming devices are searched for, and the retrieved image forming devices are collectively registered on the service providing device.

The information processing device of an aspect according to the present invention that includes a service is communicable with a service providing device that provides a print service and an image forming device that executes printing by using the print service. The information processing device includes a transmission unit configured to transmit, to a plurality of image forming device, a registration request to the service providing device; a receipt unit configured to receive, from the plurality of image forming devices that has accepted the registration request, location information for accessing the service providing device corresponding to the each image forming device; and a display unit configured to access the service providing device based on the received location information, and receive and display an authentication screen for inputting authentication information. A user corresponding to the authentication and the plurality of image forming devices are associated with each other and managed after authentication information is input on the displayed authentication screen.

According to the information processing device of the present invention, a plurality of image forming devices are searched for, and the retrieved image forming devices can be collectively registered on the service providing device.

Further features of the present invention will become apparent from the following description of exemplary embodiments with reference to the attached drawings.

BRIEF DESCRIPTION OF DRAWINGS

FIG. 4A illustrates management information stored in a print service.

FIG. 4B illustrates management information stored in a print service.

FIG. 13 is data acquired by a registration application through a printer search.

FIG. 18A is a datum saved by the registration application.

FIG. 18B is a datum saved by the registration application.

FIG. 18C is a datum saved by the registration application.

FIG. 22C illustrates screen represented on a Web browser by the image forming device.

DESCRIPTION OF EMBODIMENTS

First Embodiment

Figure 1:
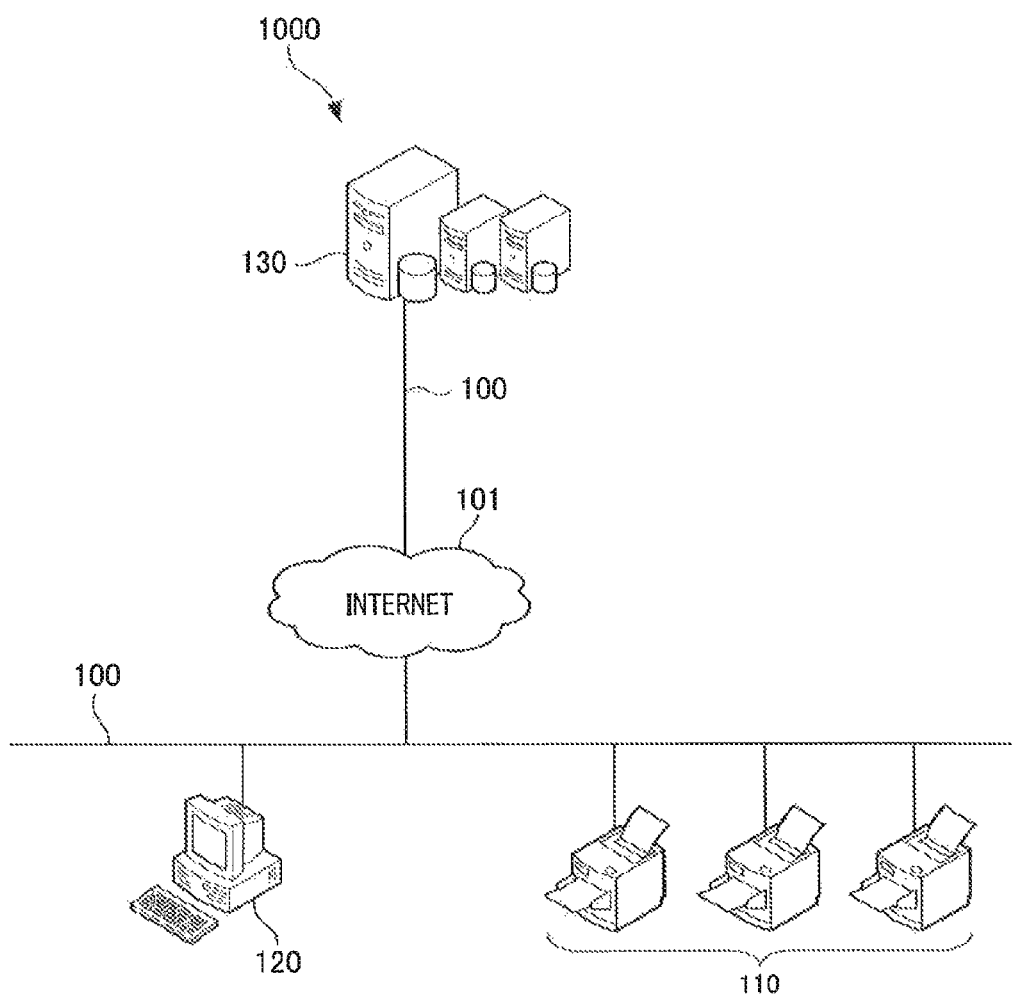
FIG. 1 illustrates a configuration example of a printing system in a first embodiment.

FIG. 1 is a diagram illustrating an example configuration of a printing system 1000. The printing system 1000 includes a client 120, an image forming device group 110 having one or more image forming devices. The client 120 and the image forming device group 110 are located in a user environment and connected with each other via a network 100. The network 100 is connected to the Internet 101. The client 120 and the image forming device group 110 may be connected via the Internet 101. The printing system 1000 also includes a print server group 130. Each device and server constituting the printing system 1000 can communicate with each other and perform data communication via the Internet 101. Note that client device may consist of a plurality of devices. Also, the image forming device group 110 and the print server group 130 are configured with multiple units, but one unit is also acceptable. Also, a user who utilizes the printing system 1000 is not limited to one user, but the client 120 may be offered for each user.

Figure 2:
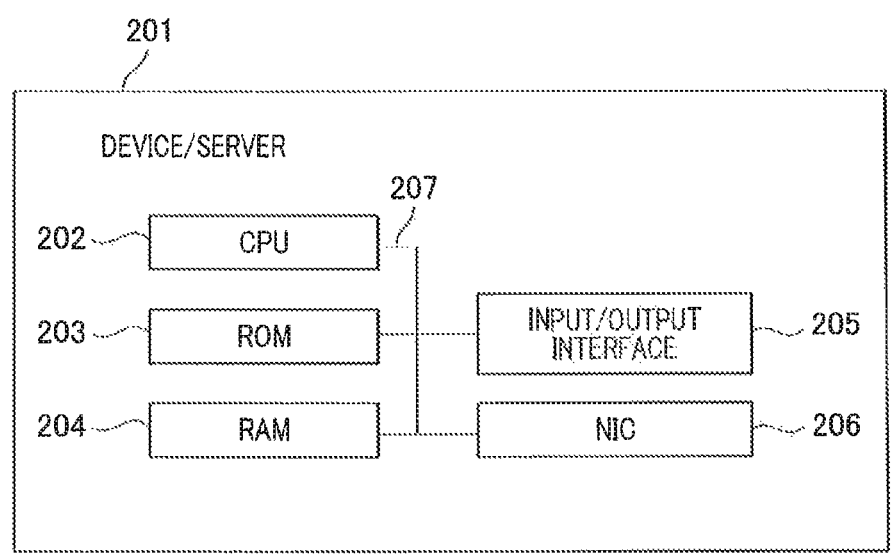
FIG. 2 illustrates hardware configuration examples of devices and a print server consisting of a printing system.

Next, a description will be given of an example hardware configuration of each device and server constituting the printing system 1000. Each device/server denotes each the image forming device, the client 120, and the print server group 130 configuring the printing system 1000. FIG. 2 illustrates a configuration example of each device and server configuring the printing system 1000. Reference numeral 201 denotes each device and server configuring the printing system 1000. Reference numeral 202 denotes a CPU (Central Processing Unit), and a unit that executes various programs so as to realize a variety of functions. Reference numeral 203 denotes a ROM (Read Only Memory), and a unit that stores various programs. Reference numeral 204 denotes a RAM (Random Access Memory), the CPU 202 executes programs stored in the ROM 203 by loading them into RAM 204. The RAM 204 is also the unit used as a temporary working storage area.

An Input/Output interface 205 is an interface that transmits data to a display (not shown) connected to the each device and server, and receives data from a pointing device (not shown). An NIC (Network Interface Card) 206 is a unit for connecting each device and server configuring the printing system 1000 to the network 100. The aforementioned units can transmit and receive data via a bus 207. Also, each print controlling unit provided in the image forming device group 110 installs a print unit (not shown), the print unit can transmit and receive data to/from the each units via a bus 207. The print unit is a unit that can print a raster image on a paper medium.

Figure 3:
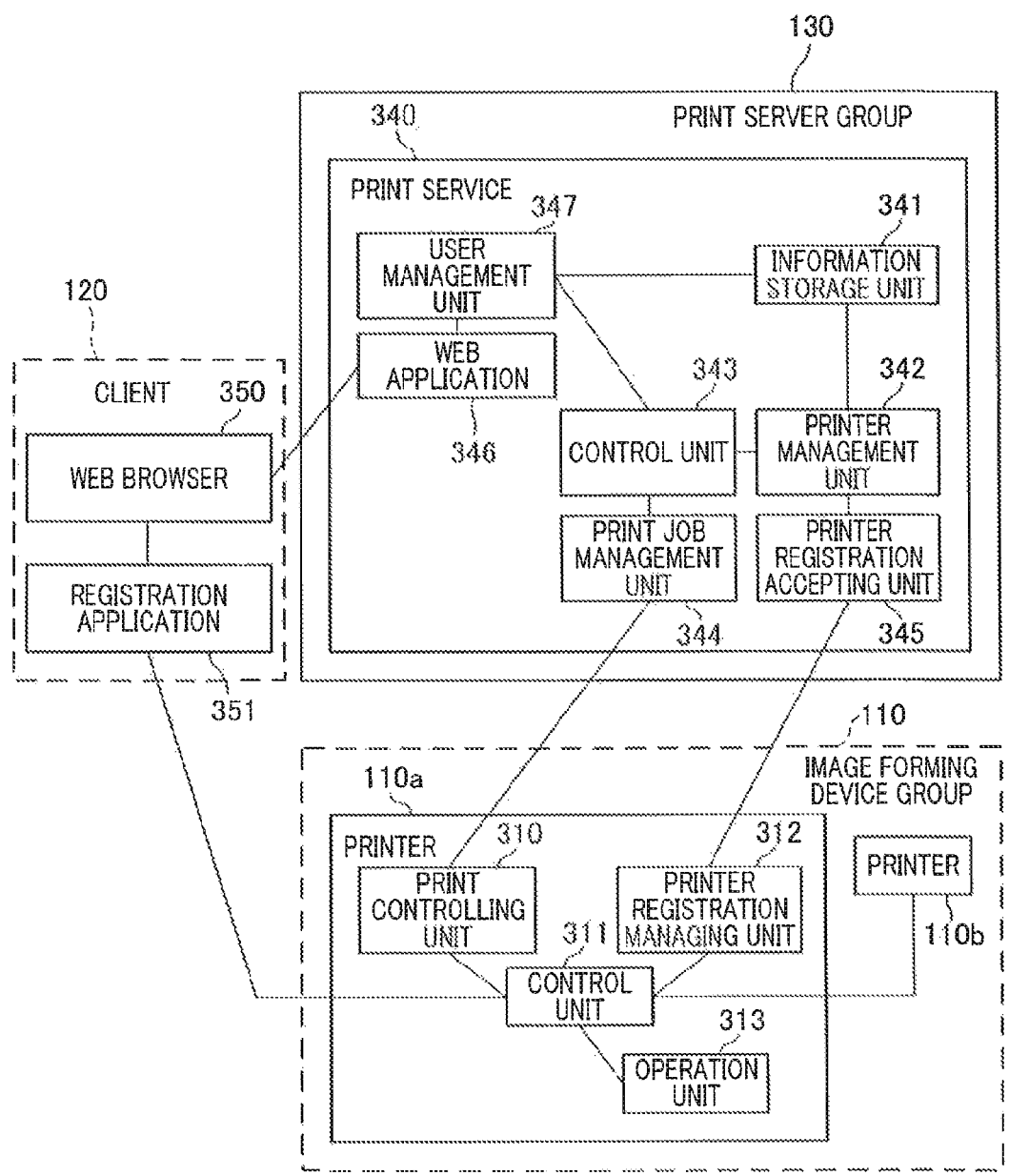
FIG. 3 illustrates software configuration examples of each device and a print service.

Next, a description will be given of software configuration examples of each device and server that constitute the printing system 1000. FIG. 3 illustrates software configuration examples of each device and server that constitute the printing system 1000. As shown in FIG. 3, the printing system 1000 includes an image forming device group 110, a print server group 130, and a client device 120. Programs that realize each software configuration shown in FIG. 3 are stored in the ROM 203 of the each device and server, the CPU 202 realizes functions of the each device and server by loading the programs to the RAM 204 and executing them.

The print server group 130 is a service providing device that provides the client 120 with web services. The web services include a print service explained hereinafter, and include services required for realizing the print service. The print server group 130 virtualizes a plurality of servers such that they are considered to be one server, and realizes functions of the print service 340 in one server. Note that, the print server group 130 activates a plurality of virtual machines in the one server, and cause the respective virtual machines to realize the functions of the print service 340. The print service 340 indicates the one among the servers. Naturally, only the one server may realize the print service 340.

The print service 340 includes an information storage unit 341, a print management unit 342, a control unit 343, a print job management unit 344, a printer registration accepting unit 345, a Web application 346, and a user management unit 347. The control unit 343 controls the cooperation between the respective units configuring the print service 340. The information storage unit 341 is a database that saves information of a registered image forming device and a user. The print management unit 342 manages the registered image forming device and an image forming device for which a registration is requested. The print job management unit 344 carries out control so as to generate a print job upon receipt of a print instruction from the Web browser 350, and transmits the print job to the image forming device designated from among the image forming device group 110. The print service from the print server group 130 can be offered to the printer 110a by the print job management unit 344. "Print service" denotes a service in which a print job generated based on print data transmitted to the print server group 130 is transmitted to the printer 110a, and the printer 110a executes printing based on the print data. The printer registration accepting unit 345 accepts, from the image forming device, a registration request of a printer to the print service 340, and instructs the print management unit 342 to manage the printer. The Web application 346 accepts various requests from the Web browser 350, and provides a login screen for logging into the print service 340, a printer management screen or the like with the Web browser 350. The user management unit 347 manages user information of a user who utilizes the print service 340.

The client 120 is an information processing device that performs a print instruction by using the print service 340. The client 120 includes a Web browser 350 and a registration application 351. The Web browser 350 acquires a login screen for logging into the print service 340, a printer management screen by communicating with the Web application 346 of the print server group 130 to thereby realize various operations. The registration application 351 searches for one or more image forming devices configuring the image forming device group 110, and performs processing for registering the retrieved image forming devices on the print service 340. The image forming device group 110 consists of a plurality of image forming devices such as a printer 110a or a printer 110b. In FIG. 3, only a configuration of the printer 110a is described, the printer 110b or the like has the same configuration.

The printer 110a can communicate with the client 120 and the print server group 130 via the network. The printer 110a includes a print controlling unit 310, a control unit 311, a printer registration management unit 312, and an operation unit 313. The control unit 311 controls the cooperation between the print controlling unit 310, the printer registration management unit 312, and the operation unit 313 of the printer 110a. The print controlling unit 310 controls print processing in the printer 110a through the print service 340. The printer registration management unit 312 controls processing in relation to a printer registration on the print service 340. The operation unit 313 is a user interface such as a panel provided in the image forming device. The print controlling unit 310 and the printer registration management unit 312 connect to the network 100 to thereby communicate with each other.

FIG. 4A and FIG. 4B are diagrams illustrating information stored in the information storage unit 341 of the print service 340. The information storage unit 341 stores user information and printer information registered on the print service 340. As shown in FIG. 4A, the information storage unit 341 stores a printer name 401, a PID 402, a printer IP address 403, capabilities 404, a user account 405, and a password 406. The information storage unit 341 associates user information with printer information that the printer registration has been made, and stores them.

The printer name is a name assigned to the printer 110a, and is used when the printer 110a is called. Note that, because the printer name differs from identification information, there may be a case where the printer names of the respective printers are the same. The PID is unique identification information assigned to each printer. For example, a Mac address is available as unique identification information, but not limited thereto. By specifying the PID, the installation location of the printer 110a is specified. The printer IP address is information indicating an address (addressing) of the image forming device on the network.

The capabilities include information indicating whether the printer 110a can perform duplex printing, color printing, a paper size that the printer 110a can output, or the like. Naturally, the capabilities are not limited to above matters, and may include any information in relation to print functions of the image forming device. This information is recorded in a capability file (not shown), and the capability file is retained by the information storage unit 341. The capabilities 403 in FIG. 4A indicate a method example in which capabilities are managed by the capability file name. The user account 405 is user identification information assigned to a user. The password 406 is a character string required for user authentication upon login to the print service 340 with the user account, and may be encrypted. A description of FIG. 4B will be given hereinafter.

Figure 8:
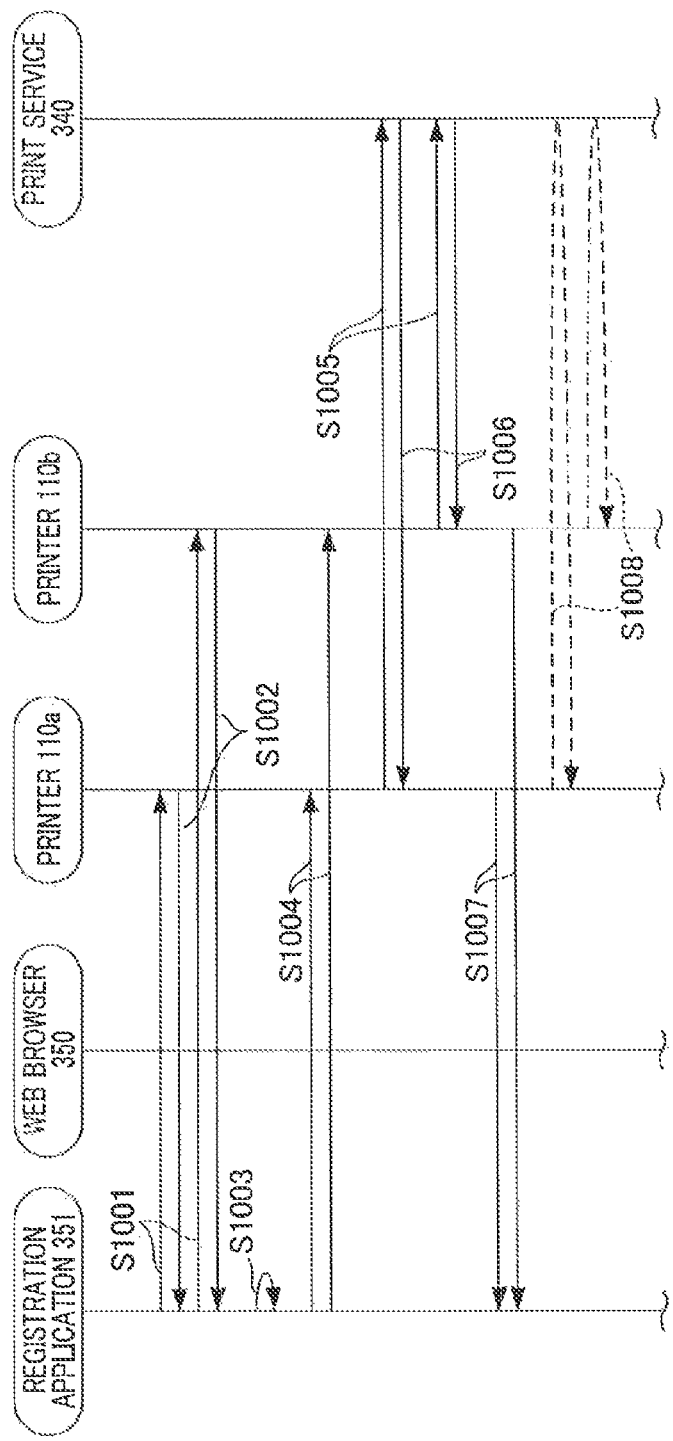
FIG. 8 illustrates processing for registering an image forming device on a print server in the first embodiment.
Figure 9:
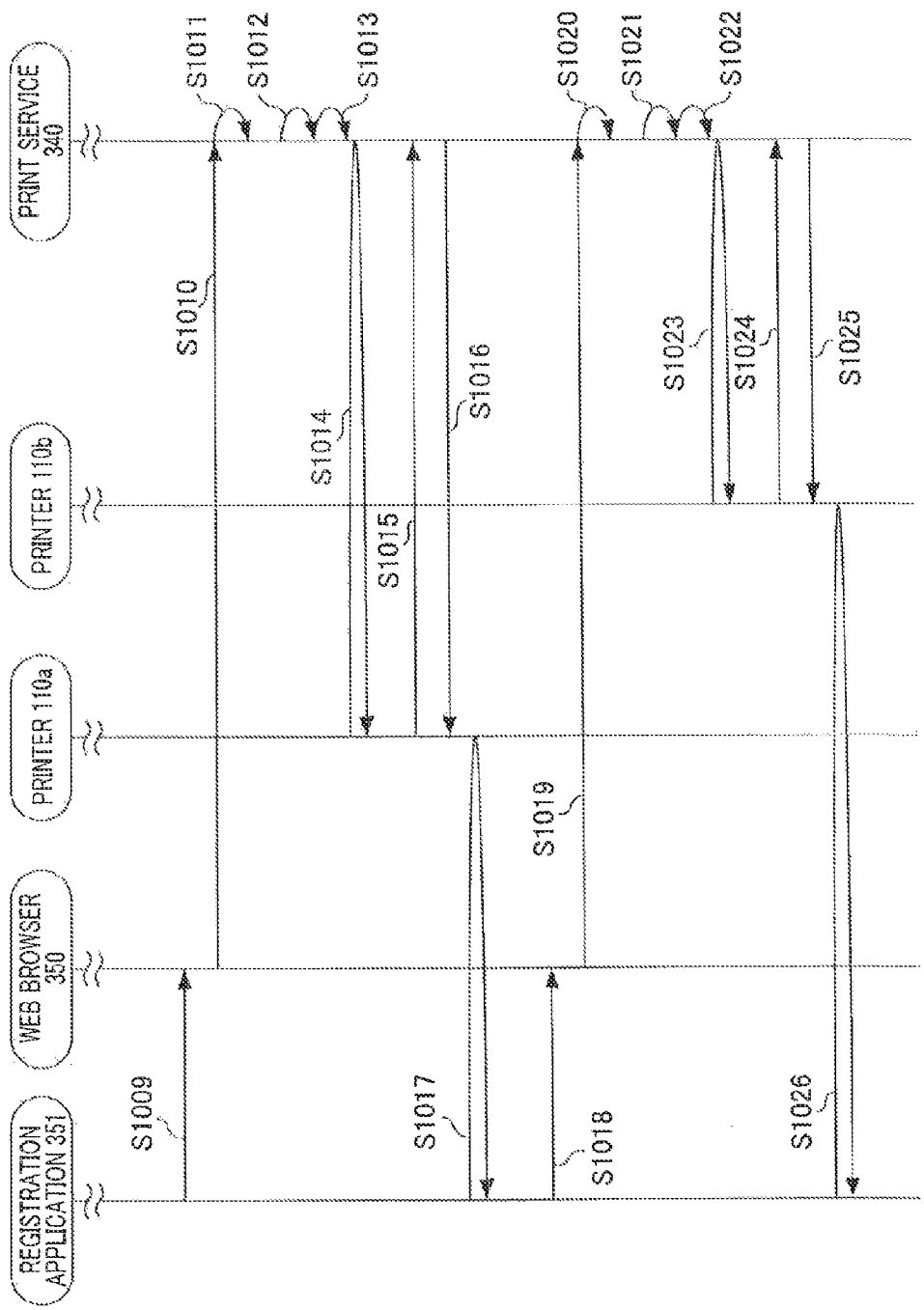
FIG. 9 illustrates processing for registering an image forming device on a print server in a second embodiment.

A description will be given of the processing for registering the image forming device group 110 on the print service 340 with reference to FIG. 5 to FIG. 8. FIG. 8 and FIG. 9 is a diagram illustrating the processing for registering the image forming device group 110 on the print service 340 in a first embodiment. In the present embodiment, assume that a user account/password pair is registered on the print service 340 in advance, and a user account/password pair for the print service 340 is issued and managed by the print service (this arrangement is applied to other embodiments described below).

Figure 7A:
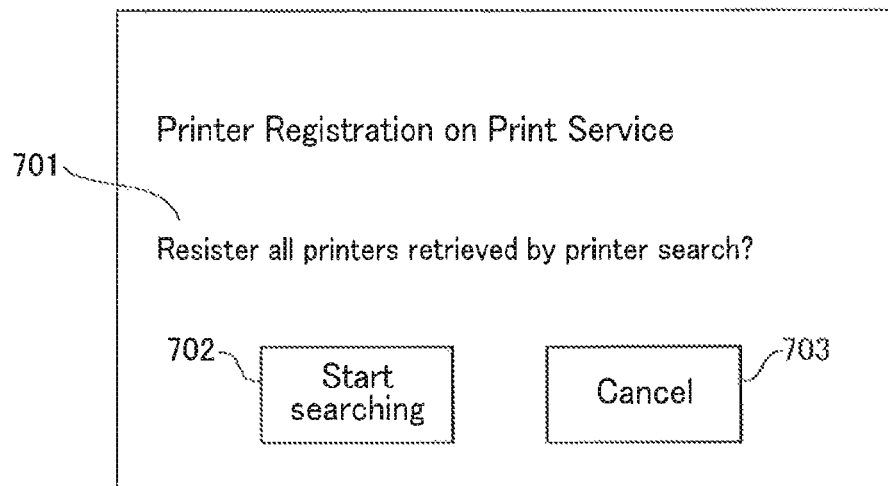
FIG. 7A illustrates printer registration screens displayed by a registration application.

When a user activates the registration application 351 on the client 120, the registration application 351 displays a user interface as shown in FIG. 7A for starting a search of one or more image forming devices to be registered on the print service 340. An execution screen shown in FIG. 7A consists of a message display portion 701, a search start button 702, and a cancel button 703. The message display portion 701 displays a message for querying a user whether to start a printer search. The search start button 702 is a button for instructing the registration application 351 to start the printer search. The cancel button 703 is a button for terminating the registration application 351 without causing the registration application 351 to execute the printer search. Upon detection of pressing of the search start button 702 by a user operation, the registration application 351 functions as a search device, and starts the printer search (S1001). The registration application 351 searches for image forming devices connected to the same network. A WS-Discovery, an SNMP (Simple Network Management Protocol) or the like is used as a printer search protocol.

As an example, a description will be given by using the WS-Discovery. The WS-Discovery is one of the device search methods, and defined by ASIS (Organization for the Advancement of Structured Information Standards). Note that, the WS-Discovery is described in a XML format in the example, but not limited thereto.

The registration application 351 multicasts PROBE packet data as a device search script to the network 100 (S1001). A packet transmission range at this time is a range in which a user can use the network. The printers 110a, 110b included in the image forming device group 110 transmits PROBE-MATCH packet data as a response to the registration application 351 upon receipt of the PROBE packet data (S1002). In the present embodiment, assume that the printer 110a (a first image forming device) and the printer 110b (a second the image forming device), that is, a plurality of printers has responded.

The registration application 351 that has received the PROBEMATCH packet data requests a printer name, a PID, a printer IP address, and capabilities of each image forming device to the printer 110a, 110. Also, the registration application 351 transmits GetMetaData packet data for acquiring information about whether or not the image forming device is compatible with the print service 340 to the printers 110a, 110b. Information transmitted by the registration application 351 at this time is not limited to above information, but information that requests icon image data representing the printer 110a, 110 may be transmitted. The printers 110a, 110b that have received the GetMetaDatapacket data return the desired information as a response to the registration application 351. Information returned by the image forming device is described in XML and the like, FIG. 13 illustrates an example of XML. The registration application 351 confirms information about whether the printers 110a, 110b are compatible with the print service 340 from among the acquired GetMetaData packet data, and retains information of the image forming device that is compatible with the print service 340. In the present embodiment, assume that the printer 110a and the printer 110b are compatible with the print service 340.

The registration application 351 terminates the printer search after a predetermined search time has elapsed. Alternatively, the registration application 351 terminates the printer search upon detection of pressing of the cancel button 703 shown in FIG. 7A. The registration application 351 retains the image forming device compatible with the print service 340 among the image forming devices that have responded as a result of the printer search by associating them with response information in a list (referred to a search result list. See FIG. 18A.). Even the image forming devices that have responded as a result of the printer search, the registration application 351 eliminates that image forming devices that are not compatible with the print service 340 from the search result list. In the present embodiment, the printers 110a, 110b are registered on the search result list.

FIG. 18 illustrates data retained by the registration application 351. FIG. 18A illustrates a search result list. The search result list consists of a printer name 1401, a PID 1402, capabilities 1403, and a printer IP address 1404. The registration application 351 registers information of the image forming device in order when a response to the printer search has been received, and at the top of the table. The aforementioned processing is the flow of the device search by the WS-Discovery.

Next, the registration application 351 checks the number of printers registered in the search result list (S1003). The registration application 351 extracts printer IP addresses acquired and retained by the printer search in relation to all image forming devices, that is, the printers 110a, 110b registered on the search result list. Then, the registration application 351 instructs the printers 110a, 110b to access a registration application URL of the print service 340 and apply for registration (S1004). In other words, the registration application 351 functions as a transmission unit that causes a plurality of image forming devices to transmit a registration request to the print service 340. The order in which the registration application 351 passes an access instruction of the registration application URL to the printers 110a, 110b may be the order registered on the search result list. In S1004, the registration application 351 communicates with the control unit 311 of the printer 110a and the printer 110b.

In S1005, each control unit 311 instructs the printer registration management unit 312 to apply for a printer registration with respect to the printer registration accepting unit 345 of the print service 340. Upon receipt of the printer registration application, the printer registration accepting unit 345 passes printer information to the print management unit 342. The print management unit 342 stores the received printer information in the information storage unit 341. Printer information registered at this stage includes the printer name 401, the PID 402, the printer IP address 403, and the capabilities 404. At this time, user information of a user who utilizes these image forming devices is not associated with printer information in the print service 340. After storage of the printer information, the print management unit 342 creates a user authentication URL, a printer authentication ticket and a printer polling URL. The printer polling URL and the user authentication address are associated with each other, and are individually prepared with respect to all image forming devices to be registered.

Information such as the printer IP address is included in the printer polling URL transmitted by the print service 340, and thus, the print service 340 can identify the image forming device that has executed polling. The printer polling URL is a URL by which the printer registration management unit 312 requests and acquires the printer authentication ticket from the printer registration accepting unit 345 of the print service 340. Since an authentication is required for an access from the printer 110*a* to the print service 340, the print management unit 342 needs to acquire the printer authentication ticket. Also, the user authentication URL is location information such that the registration application 351 or the Web browser 350 requests the authentication to the print service 340. Although not limiting, the printer IP address and the like of each image forming device are included in the user authentication URL, and thus, the print service 340 can associate the image forming device that has accessed the user authentication URL and that corresponds to the client 120. Then, the printer registration accepting unit 345 of the print service 340 transmits this information to the printer registration management unit 312 of the printers 110*a*, 110*b* (S1006).

The printers 110*a* and 110*b* respectively transmit the user authentication URL to the registration application 351 (S1007). The registration application 351 functions as a receipt unit and receives the user authentication URL for accessing the print service 340 corresponding to the image forming device. The registration application 351 confirms the user authentication URL by the number of the image forming devices that have been checked in S1003. The registration application 351 associates the received user authentication URL with each image forming device so as to update the search result list. In this manner, the search result list consists of the printer name 1401, the PID 1402, the capabilities 1403, the printer IP address 404, and the user authentication URL 1405 (FIG. 18B). Although not limiting, at this time, the registration application 351 registers printer information in order when the user authentication URL has been received, and in the top of the search result list. In this case, the printer 110*a* is first registered, then the printer 110*b* is registered in the search result list as the order. Next, the registration application 351 instructs the Web browser 350 to access the user authentication URL according to the order registered in the search result list.

Figure 5:
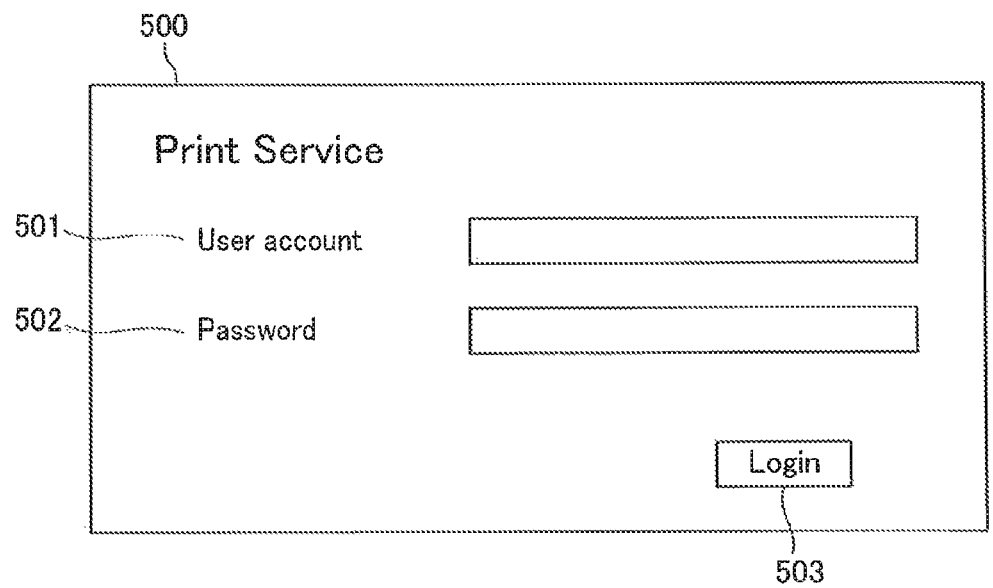
FIG. 5 illustrates a login screen for logging into a print server.

Processing in S1009 to S1026 will be given with reference to FIG. 9. In S1009, the registration application 351 instructs the Web browser 350 to access the user authentication URL in relation to the printer 110*a*. In S1010, the Web browser 350 functions as a display unit and accesses the user authentication URL to thereby acquire and display a login screen as an authentication screen from the Web application 346 of the service 340. FIG. 5 illustrates a login screen 500 for logging into the print service 340. The login screen 500 consists of a user account input portion 501, a password input portion 502, and a login button 503. The user inputs the user account 405 and the password 406 on the login screen 500 displayed by the Web browser 350. When the login button 503 is pressed, the Web browser 350 detects a transmission instruction to the print service 340 so as to transmit the user account 405 and the password 406 to the print service 340.

In accordance with the processing in S1010, the print service 340 executes an authentication (S1011). At this time, the Web browser 350 accesses the Web application 346 of the print service 340. The user management unit 347 executes the authentication by verifying the user account 405 and the password 406 registered in the information storage unit 341 by querying the user management unit 347. When the user authentication has been successful, the user management unit 347 requests the print management unit 342 via the control unit to associate the account information and the printer information acquired in the printer registration processing of S1005 (S1012). The user authentication URL used by the Web browser 350 for the access in S1010 is a URL dedicated to the printer 110*a*, and thus, association of the user account information with printer information of the printer 110*a* can be realized.

Figure 6:
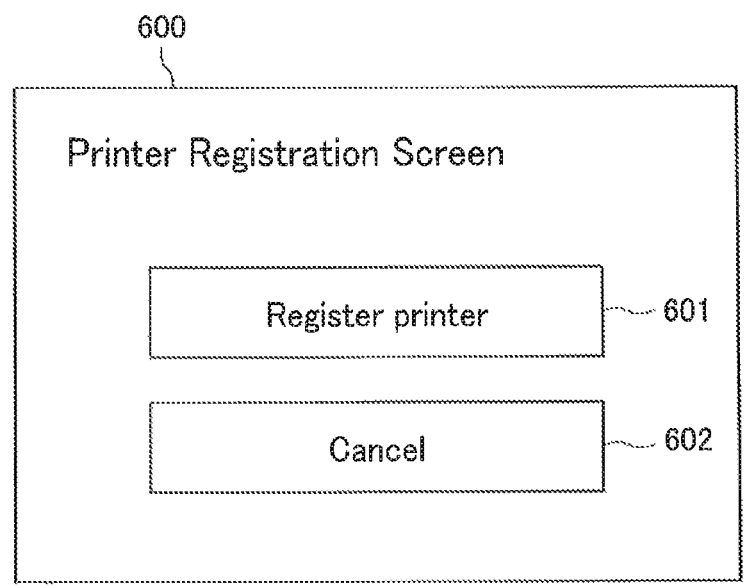
FIG. 6 is a diagram illustrating a printer registration screen.

Alternatively, the association processing in S1012 may be executed when the print service 340 transmits a screen shown in FIG. 6 to the Web browser 350 after the processing in S1011, and when the print service 340 expressly receives a printer registration instruction from the Web browser 350 by a user operation. FIG. 6 is the printer registration screen. The printer registration screen consists of a print registration button 601 and the cancel button 602. The print registration button 601 is a button for transmitting an instruction for registering the printer. The cancel button 602 is a button for transmitting an instruction for cancelling the printer registration.

When the user information and the printer information are associated with each other in S1012, the print service 340 sets a printer authentication ticket in the printer polling URL (S1013). The printer authentication ticket is authentication information by which the image forming device acquires access information (that is, the access ticket) for utilizing the print service 340. In S1014, the printer registration management unit 312 of the printer 110*a* polls the printer polling URL, acquires a printer authentication ticket, and terminates polling. The printer 110*a* that has acquired the printer authentication ticket accesses an access ticket acquisition URL with the printer authentication ticket (S1015). The printer registration accepting unit 345 of the print service 340 confirms that information of the printer authentication ticket is correct, and issues an access ticket to the printer 110*a* (S1016). The printer registration management unit 312 passes the received access ticket to the print controlling unit 310 via the control unit 311. Subsequently, the print controlling unit 310 accesses the print job management unit 344 of the print service 340 according to the information of the access ticket to thereby perform processing such as acquisition of a print job. At this time, the printer 110*a* that has received the access ticket may execute printing for notifying a user of a registration completion. The aforementioned processing is the printer registration processing to the print service 340 by the printer 110*a*, which has been started in S1009.

Detection of completion up to the processing in S1016 is required for the registration application 351 in order to register subsequent printers after the first printer to the print service 340 depending on the order. In the present embodiment, the registration application 351 periodically queries the printer 110*a* so as to confirm that the access ticket has been acquired (S1017). In other words, the registration application 351 functions as a confirmation unit and confirms whether or not the image forming device has been registered on the print service 340. In the present embodiment, the fact that the printer 110*a* has acquired the access ticket is considered as printer registration completion on the print service 340 by the printer 110*a*. The detection method in S1017 may be a method in which, when the printer 110*a* acquires the access ticket, the printer 110*a* notifies the registration application 351 of the acquisition so that the registration application 351 detects the acquisition.

After confirmation of registration completion of the printer 110*a* on the print service 340, the registration application 351 starts access processing to the user authentication URL in relation to a printer (the printer 110*b*) that was registered second in the search result list. In the present embodiment, the registration application 351 implements processing from S1018 to S1025 with respect to the printer 110b in a manner similar to the processing from S1009 to S1016. The registration application 351 also implements the same processing in a manner similar to the processing in S1017 to the printer 110b (S1026). By the aforementioned processing, the plurality of image forming devices that have been retrieved by means of the device search can be registered on the print service 340. In this manner, there is no need for a user to perform the device search by himself and register the searched out image forming devices on the print service one by one, and this results in a reduction of burden of the user.

The registration application 351 terminates processing when detecting an access ticket reception by all image forming devices which the registration processing has been executed and are described on the search result list. The registration application 351 displays the fact that the processing is terminated on the user interface (FIG. 7D), and the user may perform a termination operation. The user interface shown in FIG. 7D is a screen that is displayed when the printer registration on the print service 340 is completed. This screen is configured of a printer registration status display portion 711 and a close button 712. A printer registration status in relation to the print service 340 is displayed on a printer registration status display portion 711. For example, information that the printer registration on the print service 340 has been completed and information of the registered image forming devices are displayed. The close button 712 is a button that enables the registration application 351 to be terminated by a user operation.

Figure 7B:
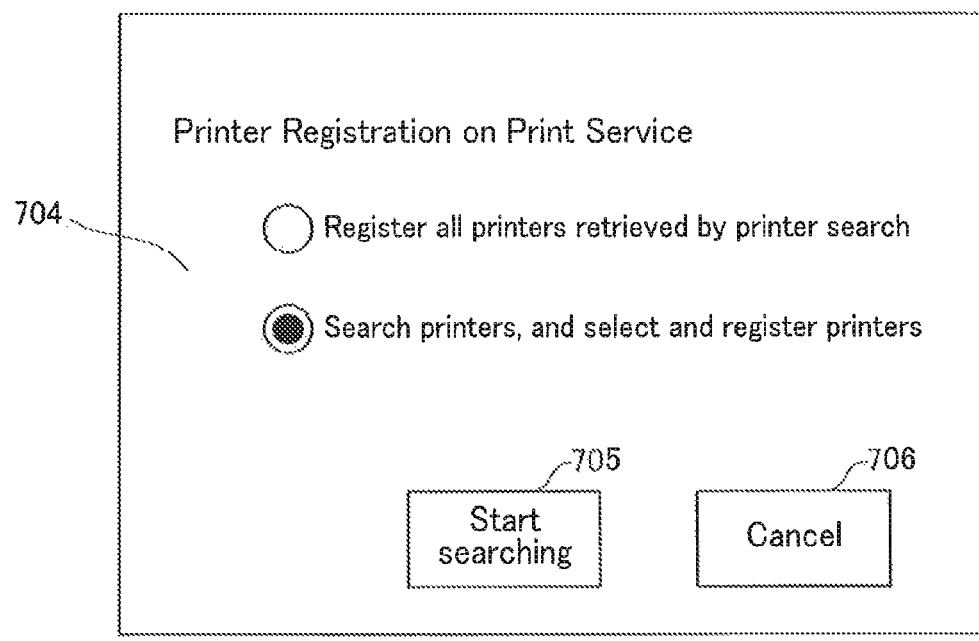
FIG. 7B illustrates printer registration screens displayed by a registration application.

Although the registration application 351 that has been activated in S1001 displays the screen shown in FIG. 7A, the registration application 351 may display a screen shown in FIG. 7B. The screen shown in FIG. 7B includes a function for designating a printer registration method to the print service 340, and includes a printer registration method designating portion 704, a search start button 705, and a cancel button 706. The printer registration method designating portion 704 has a function for designating how to register the printers retrieved by the printer search on the print service 34. For example, the following two methods are proposed as the printer registration method that can be designated on the designating portion 704.

The first method is to register all image forming devices retrieved by the printer search on the print service 340. The registration application 351 may display all of the retrieved image forming devices on the interface (not shown) provided by the registration application 351. The registration application 351 executes the processing after S1001 using the same method as the processing of the aforementioned first embodiment. The second method is to register the image forming devices on the print service 340 by selecting image forming devices for registering on the print service 340 from among the image forming devices that have been retrieved by the printer search. When the printer registration method is designated on the printer registration method designating portion 704 by a user operation and the search start button 705 is pressed, the registration application 351 executes the printer search processing and the registration application processing in accordance with the selected printer registration method. When the cancel button 706 is pressed, the registration application 351 may terminate processing without the printer registration application processing.

Figure 7C:
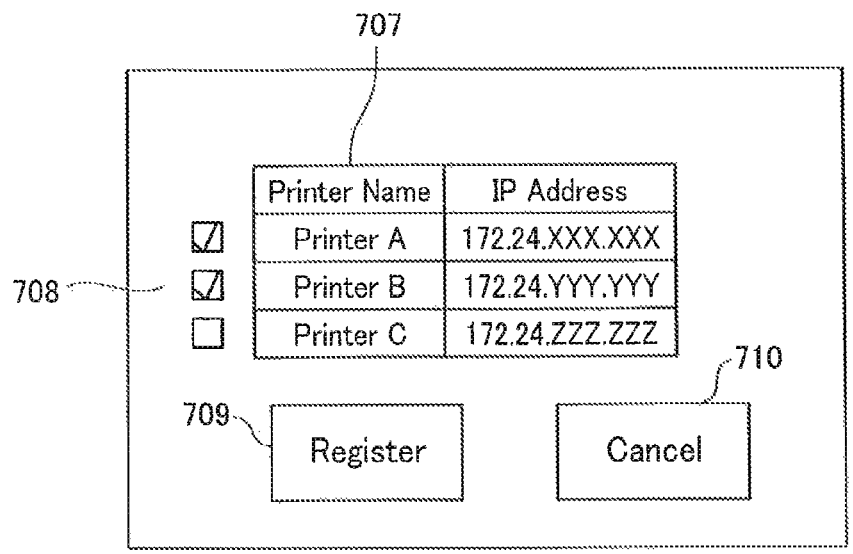
FIG. 7C illustrates printer registration screens displayed by a registration application.
Figure 7D:
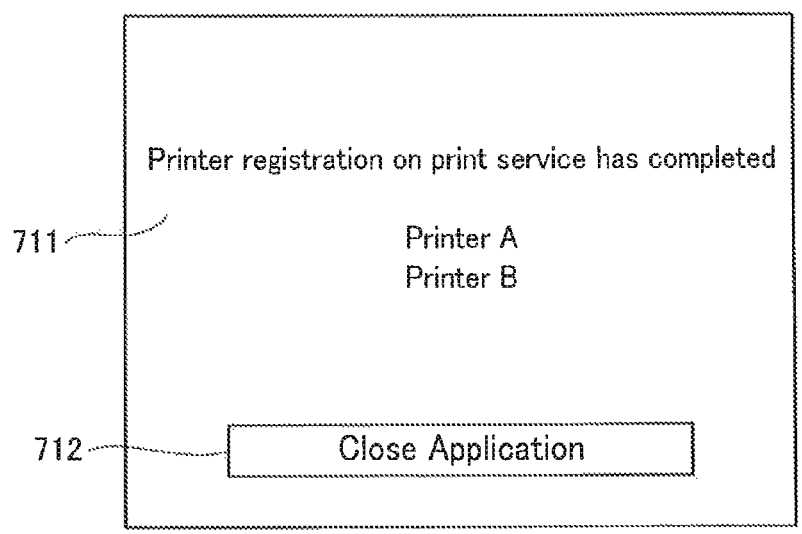
FIG. 7D illustrates printer registration screens displayed by a registration application.

When the second method is selected, the registration application 351 displays a screen as shown in FIG. 7C when the registration application 351 executes the printer search to thereby receive a response from the printers. The screen shown in FIG. 7C includes a search result display area 707, a printer selection means 708, a registration button 709, and a cancel button 710. Although printer names and IP addresses of retrieved printers by the printer search are displayed on the search result display area 707, only the printer name may be displayed and any printer information may displayed. The printer selection means 708 includes check boxes that enable a selection of the image forming devices to be registered to the print service 340.

The registration button 709 is a button for starting the processing of applying a registration of one or more printers selected by a user with the printer selection means 708 on the print service 340. When no printer has been retrieved by searching, information indicating that no printer has been retrieved is displayed on the search result display area 707. Alternatively, the printer selection means 708 and the registration button 709 may not be displayed, a processing close button (not shown) may be provided. Upon pressing the cancel button 710 by a user, the registration application 351 displays the screen shown FIG. 7B without implementing the printer registration application processing in order to allow a user to select printer registration method again by the user. In this way, when one or more printers are selected on the screen of FIG. 7C, the selected printers are registered in the search result list, and the number of selected printers is retained in the printer number confirmation processing in S1003. Naturally, the respective screens shown in FIG. 7 are not limited thereto, icons for each printer are displayed if an icon display is possible, resulting in improvement of visibility.

Second Embodiment

Figure 10:
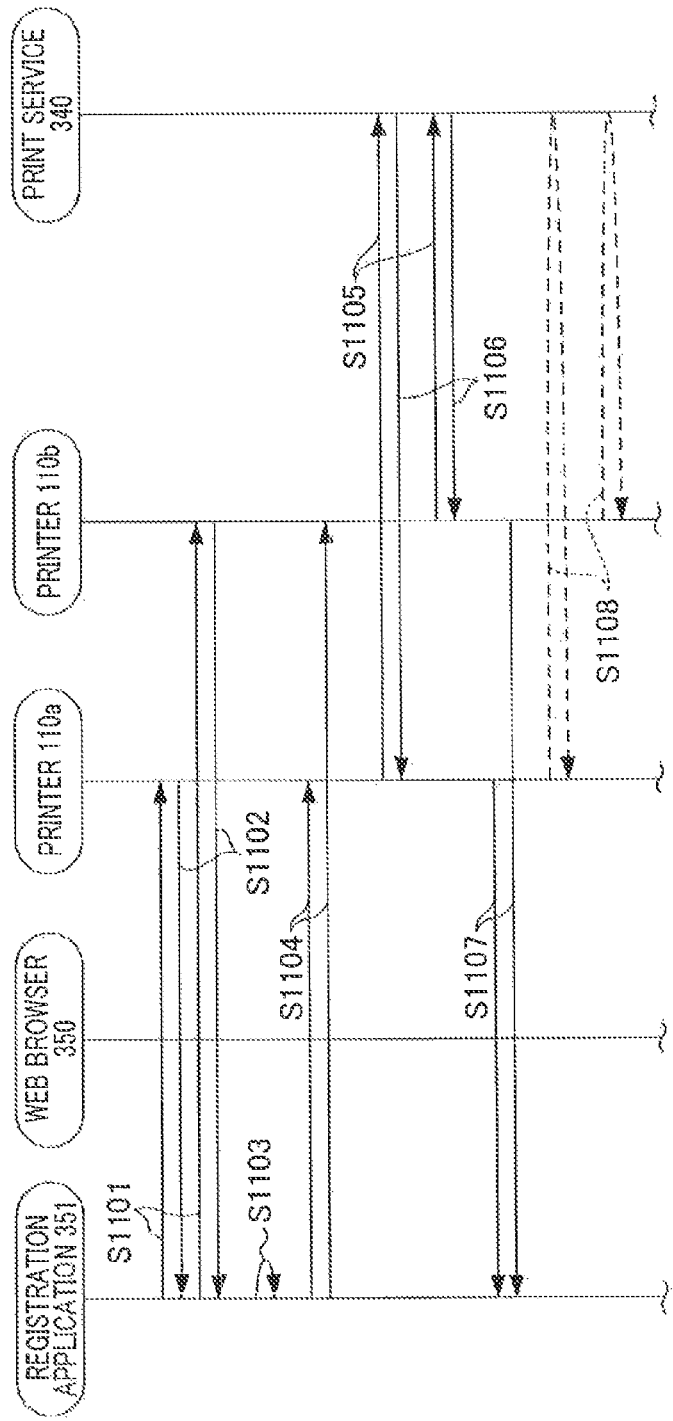
FIG. 10 illustrates processing for registering an image forming device on a print server in the first embodiment.

In the sequences shown FIG. 8 and FIG. 9 in the first embodiment, login operations to the print service 340 by a user operation are required for each image forming device. In a second embodiment, the registration application 351 automatically processes those operations. A description will be given of the method for registering the image forming device group 110 on the print service 340 in this case with reference to FIG. 10 and FIG. 11. System configurations, hardware configurations, and software configurations for realizing the present embodiment are identical to those described in the first embodiment, and thus, those descriptions are omitted. Also, regarding portions not described in the second embodiment, contents described in the first embodiment applied to the second embodiment.

The registration application 351 on the client 120 is activated, the user interface (FIG. 7A) for performing a printer search and instructing a printer registration application processing to the print service 340 is displayed, and the user instructs to carry out a printer search via the user interface (S1101). From the processing in S1101 to the processing in which the registration application 351 instructs the Web browser 350 to access the user authentication URL corresponding to the retrieved printer 110a (S1109), the processing is the same as those from S1001 to S1009 of FIG. 8.

Figure 11:
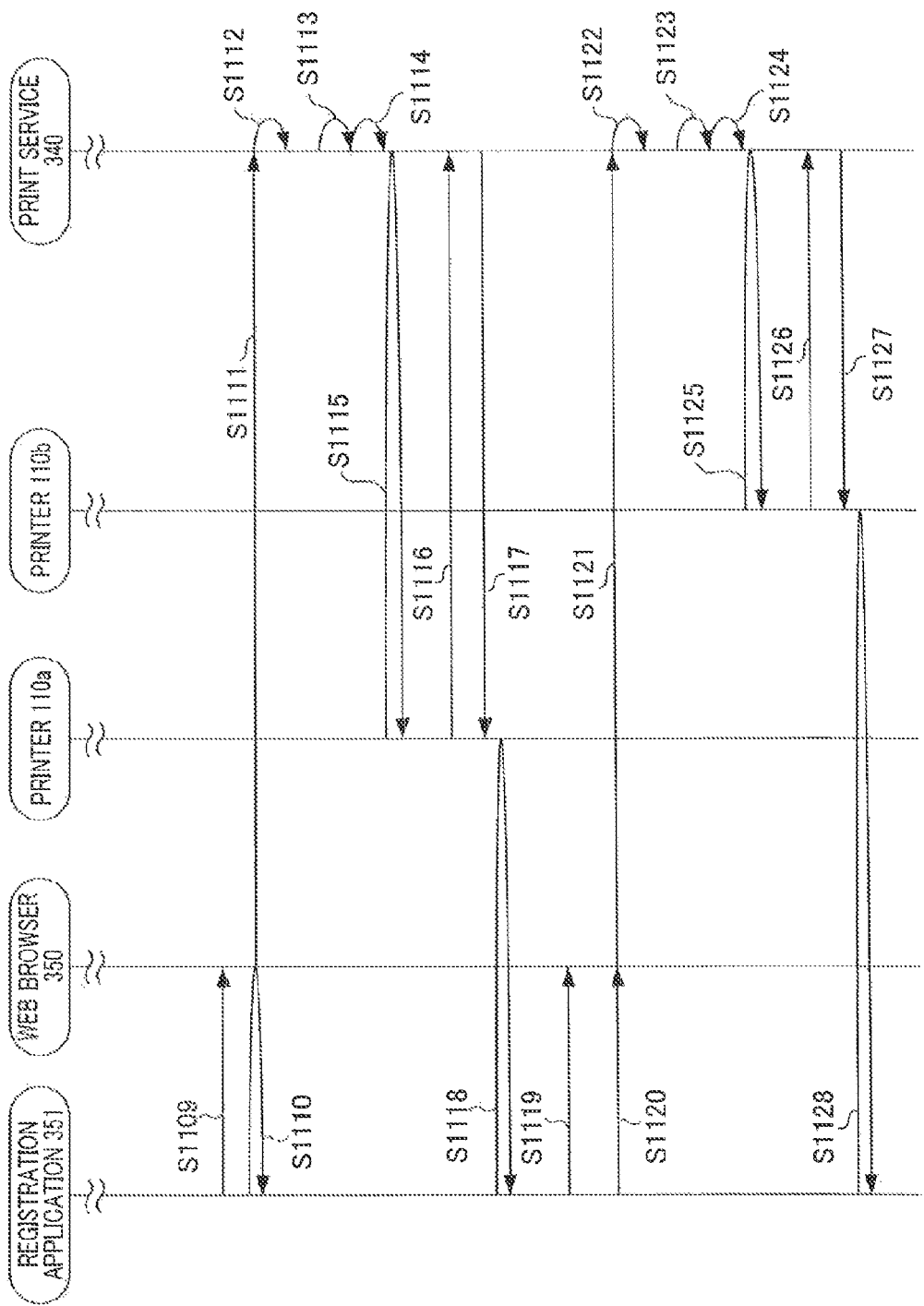
FIG. 11 illustrates processing for registering an image forming device on a print server in the second embodiment.

A description will be given of the processing from S1109 to S1128 with reference to FIG. 11. When a first printer (the printer 110a) from among the retrieved image forming devices accesses a user authentication URL so that authentication processing is performed via the login screen in S1109, the registration application 351 starts the acquisition processing of user operation information with respect to the Web browser 350 (S1110). To achieve this processing, for example, a script for passing user information acquired by the Web browser 350 in user authentication to the registration application may be added to the instruction for accessing the user authentication URL in S1009. By a user operation to the login screen (FIG. 5) being acquired for accessing to the print service 340, the Web browser 350 implements a login operation (S1111). In processing of S1110, the registration application 351 acquires a user account and a password input by the login operation. The print service 340 that has accepted a login request implements authentication (S1112).

In S1112, the print service 340 transmits a screen shown in FIG. 6 to the Web browser 350. When the Web browser 350 transmits information for instructing a printer registration by using a user operation (a press of the print registration button 601), the registration application 351 also acquires this operation information. From association processing of user information with printer information (S1113) to processing of issuing an access ticket to the printer 110a (S1117) by the print service 340, the processing is the same as those from S1012 to S1016 of FIG. 8. The processing from S1109 to S117 is registration processing of the printer 110a. Also, the registration application 351 periodically queries the printer 110a so as to confirm whether the printer 110a has acquired the access ticket (S1118). When the registration application 351 can confirm that the printer 110a has acquired the access ticket, it starts the registration processing of subsequent image forming devices (the printer 110b) on the print service 340 (S1119).

When the registration application 351 registers the subsequent image forming devices on the print service 340 in order, there is a difference in the processing in S1120 from the sequence of FIG. 8 in the first embodiment. Except for the processing in S1120, the processing from S1119 to S1128 in FIG. 9 is the same as that from S1018 to S1026 in FIG. 8. That is, the processing in S1119, the registration application 351 instructs the Web browser 350 to access the user authentication URL of the printer 110b. Then, the registration application 351 notifies the Web browser 350 of the user operation information acquired in S1110 (the user account, the password, and the operation information acquired in S1112) (S1120). When accessing the user authentication URL in S1121, the Web browser 350 utilizes the user information (the user account and the password) received from the registration application 351. When the print service 340 returns the login screen shown in FIG. 5, the Web browser 350 utilizes the user account and the password to thereby instruct the print service 340 to register a printer. In other words, after displaying the authentication screen corresponding to the first image forming device, the Web browser 350 no longer displays authentication screens corresponding to image forming devices to be registered after the first image forming device. The Web browser 350 displays only the login screen acquired from the print service in S1111.

As mentioned above, when the print service 340 returns the screen shown in FIG. 6, an instruction of the printer registration to the print service 340 can be realized by using the user operation information (pressing the print registration button 601). In this way, when the registration application 351 acquires the user operation information upon a printer registration of the first printer and automatically utilizes that information upon a printer registration of subsequent printers, a login processing according to the number of image forming device is not required by a user, resulting in a reduction of labor imposed on registration operations. In the printer processing of subsequent printers, the Web browser 350 does not need to display the screen shown in FIG. 5 or FIG. 6 received from the print service 340, but may display a registration running screen.

Third Embodiment

In the sequence shown in FIG. 8 in the first embodiment, login operations to the print service 340 by a user operation are required according to the number of image forming devices. In the third embodiment, the registration application 351 automatically processes login operations on the print service 340 in different manner from those in the second embodiment. Like with the second embodiment, unless otherwise stated, regarding portions not described, the embodiment in the first embodiment can be applied to the third embodiment. In the first and second embodiments, the registration application 351 instructs the Web browser 350 to carry out the registration processing in order to log into the print service 340 and register the image forming device. In the third embodiment, the registration application 351 directly communicates with the print service 340 to thereby implement the printer registration on the print service 340. The registration application 351 retains a user account and a password for logging into the print service 340 to thereby directly request a login to the print service 340. At this time, the registration application 351 automatically transmits the user account and the password to the print service 340. Thus, the Web browser 350 is not operated by a user.

Figure 14:
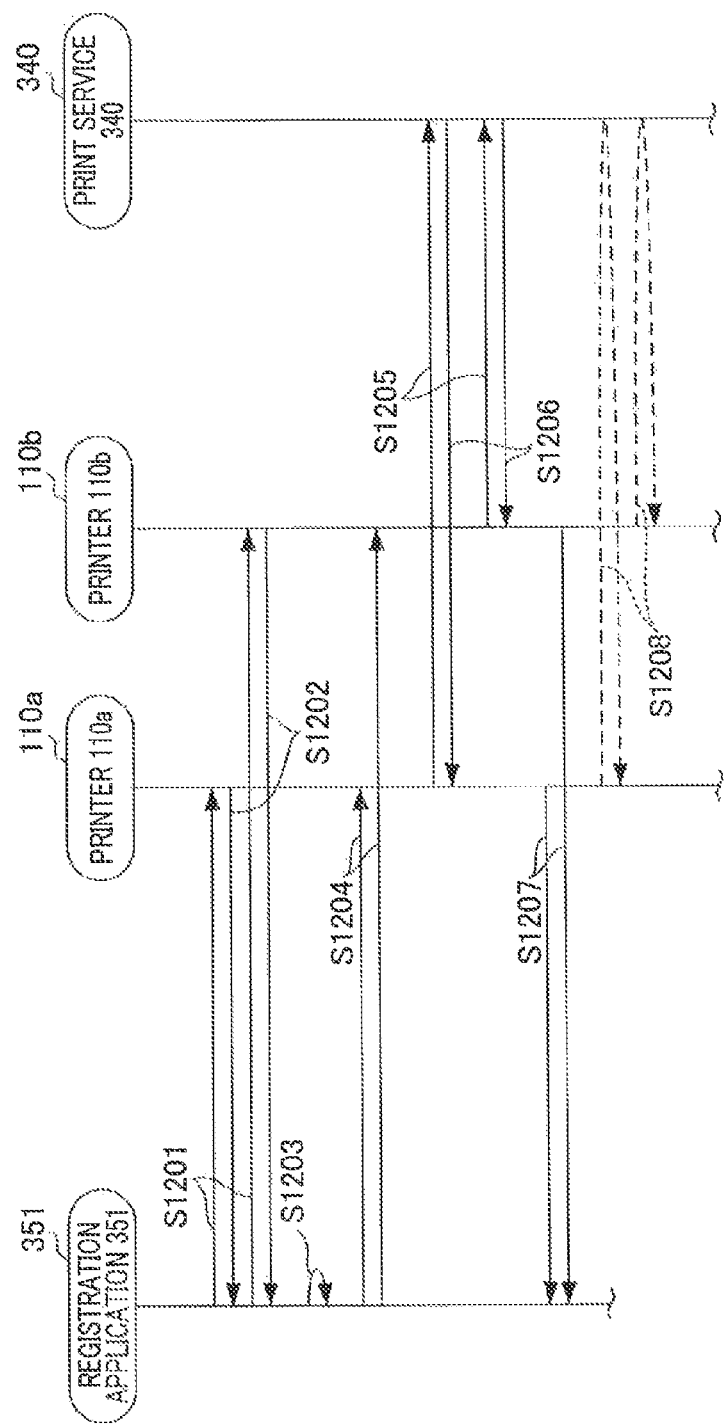
FIG. 14 illustrates processing for registering an image forming device on a print server in a third embodiment.
Figure 15:
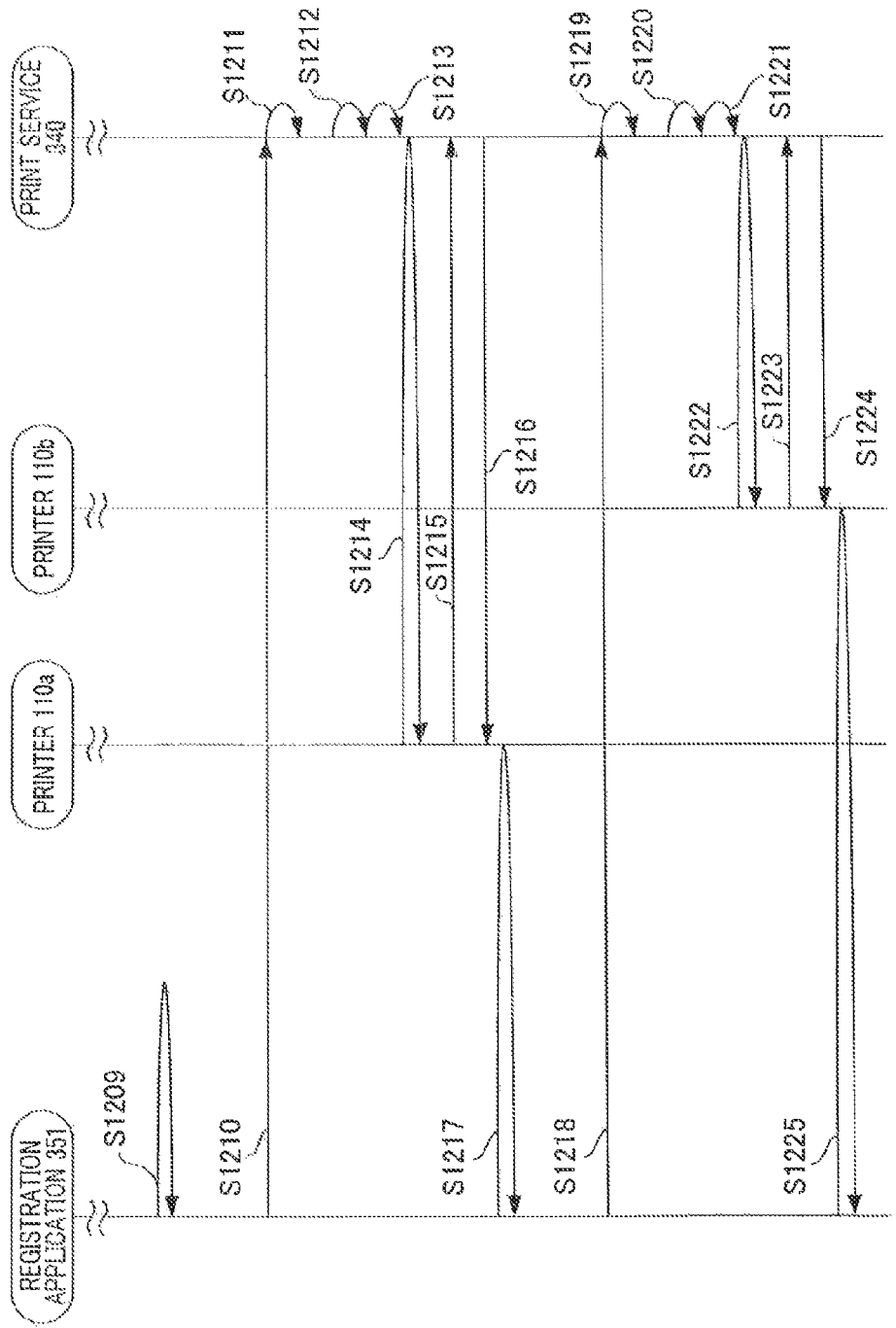
FIG. 15 illustrates processing for registering an image forming device on a print server in the third embodiment.

FIG. 14 and FIG. 15 are diagrams illustrating a method for registering the image forming device group 110 on the print service 340 in the third embodiment. The registration application 351 on the client 120 is activated, the user interface (FIG. 7A) for performing a printer search and instructing the print service 340 to perform a printer registration application is displayed, and an instructions are issued to carry out a printer search (S1201). From the processing in S1201 to the processing in which the printers 110a, 110b of the image forming device group 110 initiate polling to the print service 340 (S1208), the processing is same as those from S1001 to S1008 of FIG. 8.

Figure 12A:
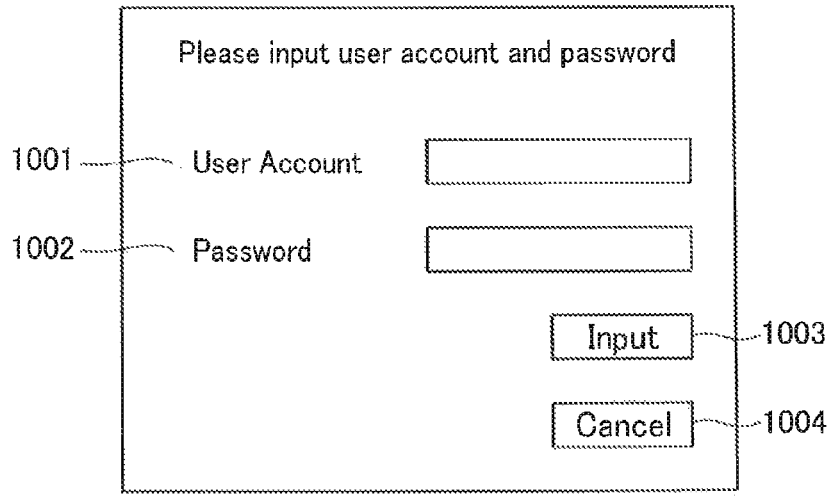
FIG. 12A illustrates printer registration screens displayed by a registration application.

Upon receipt of each user authentication URL from the printers 110a, 110b, which have been instructed to register the print service 340 in S 1207, the registration application 351 updates the search result list shown in FIG. 18A to a list as shown in FIG. 18B. Then, the registration application 351 displays a screen shown in FIG. 12A. FIG. 12A is a user interface provided by the registration application 351. The registration application 351 functions as a presentation unit and presents the user account and password input screen for logging into the print service 340. The screen shown in FIG. 12A includes a user account input portion 1001 and a password input portion 1002, an input button 1003 for detecting the completion of the input of a user account and a password by a user operation, and a cancel button 1004 for cancelling an input operation.

A description will be given of processing from S1209 to S1225 with reference to FIG. 15. The registration application 351 detects the pressing of the input button 1003. Then, the registration application 351 acquires a user account and a password input by a user operation for logging into the print service and retains them (the user account is expressed as "ID" and the password is expressed as "PW" in S1209 and FIG. 14). In S1210, the registration application 351 accesses the user authentication URL of the printer 110a, and requests the user to log into the print service 340 (S1210). At this time, the registration application 351 discards the login screen acquired from the Web application 346 of the print service 340, and transmits the user account and password retained in S1209 to the print service 340. Then, the print service 340 implements an authentication (S1211). Subsequently, the processing from S1212 to S1216, in which the print service 340 issues the access ticket to the printer 110a, is the same as that from S1012 to S1016 of FIG. 8 described in the first embodiment.

Also, the registration application 351 monitors an access ticket acquisition by the printer 110a similar to the processing in S1017 of FIG. 8 (S1217). When the registration application 351 determines that the registration of the first printer (the printer 110a) on the print service 340 has been completed, it starts the printer registration processing of subsequent printers. The order of the printer registration processing of the subsequent printers may be the order registered in the search result list (FIG. 18B). The printer registration processing of the subsequent printers (the printer 110b in this case) by the registration application 351, that is to say, the processing from S1218 to S1224, is the same as the printer registration processing of the printer 110a from S1210 to S1216.

The registration application 351 also monitors the access ticket acquisition by the subsequent printers (the printer 110b) (S1225). Upon detection of receiving the history of the access tickets by all the image forming devices, the registration application 351 displays a screen shown in FIG. 12B.

Figure 12B:
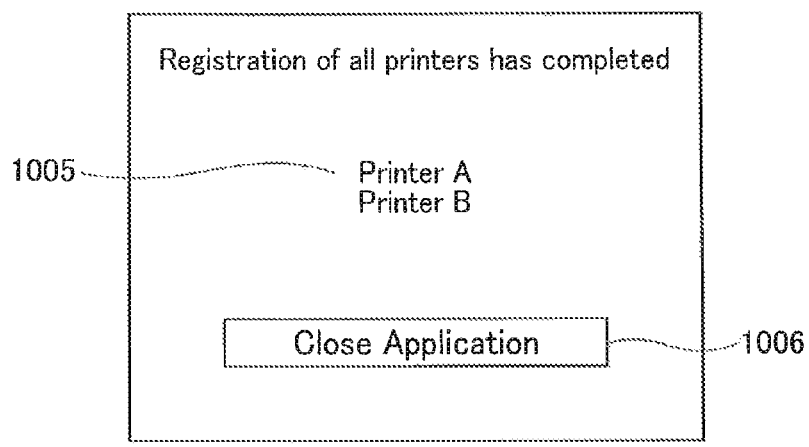
FIG. 12B illustrates printer registration screens displayed by a registration application.

FIG. 12B shows a user interface displaying a registration result of the image forming devices of which the registration processing has been performed. The screen shown in FIG. 12B includes a result display area 1005 and a close button 1006. The registration results of all image forming devices are displayed in the result display area 1005. A button can be pressed to the close button 1006 by a user operation, and the registration application 351 that detects the pressing of the button suspends the processing. "Close application" or the like may be displayed on the close button 1006. While a final registration result is displayed in the screen shown in FIG. 12B, a registration processing history screen as shown in FIG. 12C may be displayed.

Figure 12C:
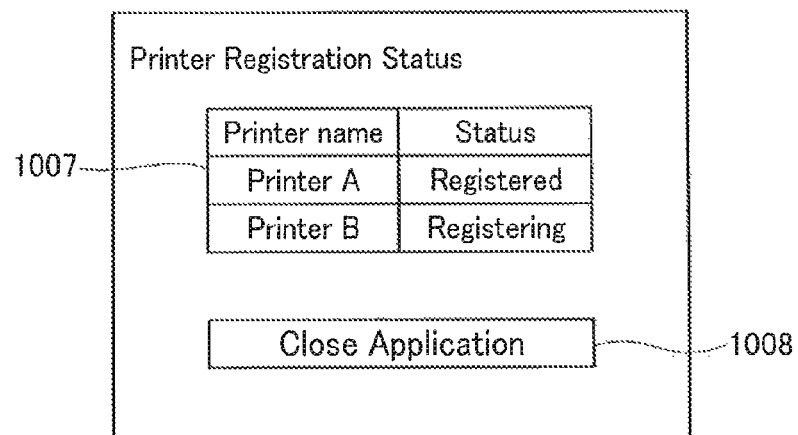
FIG. 12C illustrates printer registration screens displayed by a registration application.

The screen shown in FIG. 12C includes a registration process displaying area 1007 and a close button 1008. A registration history of the printers 110a and 110b to the print service 340 is shown in the registration process displaying area 1007. Registered and registering printer(s) are represented in the registration process displaying area 1007, an error may be displayed in the case where a registration is impossible. Upon detecting that the close button 1008 has been pressed, the registration application 351 terminates the processing. Note that a detection method for the access ticket receipt receiving history by the registration application 351 may be a method in which the printers 110a and 110b notify the registration application 351 of the access ticket acquisition as mentioned in the first embodiment. In this way, by automatically utilizing the user account and the password acquired in advance by the registration application 351 upon registration of the image forming device group 110, resulting in a reduction of burden of the user imposed on the registration processing.

Fourth Embodiment

In a printer registration method in the fourth embodiment, a plurality of image forming devices is managed as one group and a registration can be realized. Note that, with respect to the fourth embodiment, contents and modifications described in the first, second and third embodiments can also be applied to the fourth embodiment unless otherwise stated. A same user authentication URL is issued to each printer to which a printer registration has been applied with a same group ID.

Figure 16:
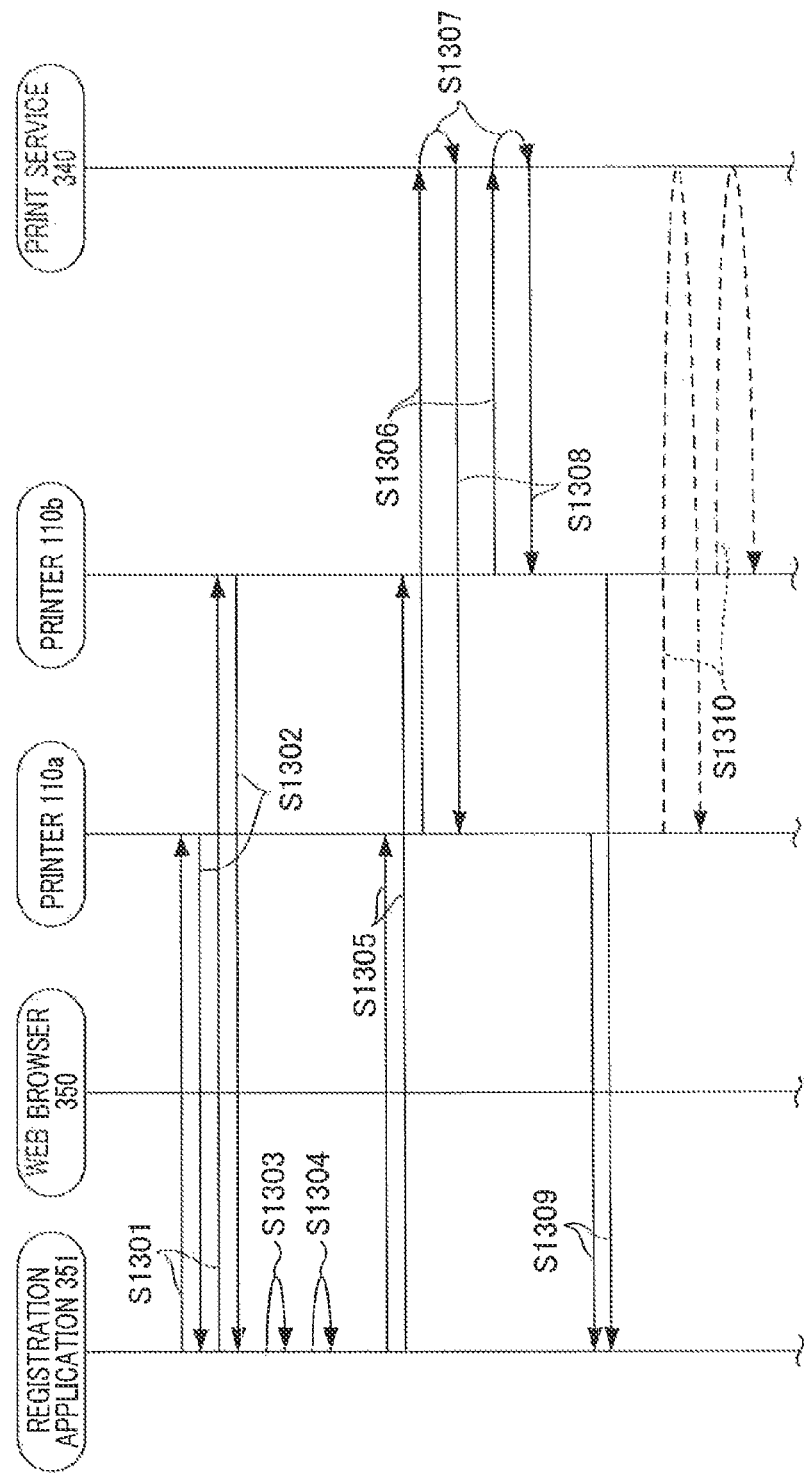
FIG. 16 illustrates processing for registering an image forming device on a print server in a fourth embodiment.
Figure 17:
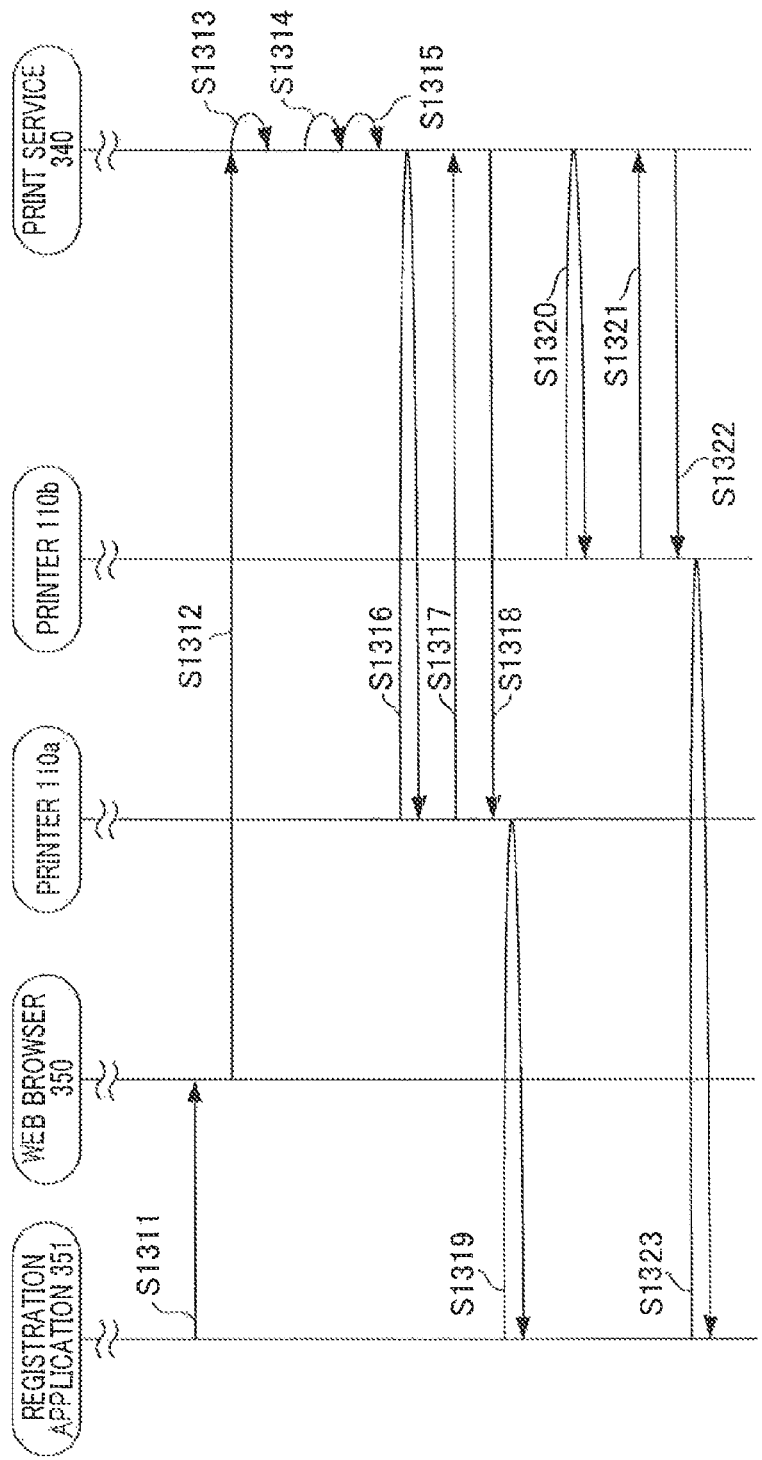
FIG. 17 illustrates processing for registering an image forming device on a print server in the fourth embodiment.

FIG. 16 and FIG. 17 are diagrams illustrating a method for registering the image forming device group 110 on the print service 340 in a fourth embodiment. The registration application 351 on the client 120 is activated, the user interface (FIG. 7A) for performing a printer search and instructing the print service 340 to perform printer registration application processing are displayed, and an instruction is issued for a printer search (S1301). The registration application 351 implements the same device search processing described in S1002 and S1003 of FIG. 8 in S1302 and S1303. Here, the registration application 351 issues a group ID to thereby considers this to be identification information of the image forming device group, associates the identification information with the image forming devices registered on the search result list, and retains a table shown in FIG. 18C (S1304, FIG. 18C).

The registration application 351 transmits the group ID to the image forming devices (the printers 110a, 110b) registered on the search result list as well as instructing them to access the registration application URL (S1305). The each printer registration management unit 312 of the printer 110a, 110b transmits the group ID and performs a printer registration application to the printer registration accepting unit 345 of the print service 340 (S1306). Upon receipt of the group ID and the printer registration application, the print management unit 342 associates the printers for each group ID and manages them in the information storage unit 341 (S1307, group ID 407 shown in FIG. 4B). However, a user account and a password are not stored in the information storage unit 341 at this stage.

The print management unit 342 creates the same user authentication URL for the image forming device that has notified of the same group ID 407. Thus, this point differs from that in the first to third embodiments in that an individual user authentication URL for each image forming device is not created. The print management unit 342 creates a user authentication URL including the group ID. Also, the print management unit 342 creates a printer polling URL including the group ID. Then, the printer registration accepting unit 345 of the print service 340 transmits the created user authentication URL, the printer authentication ticket, and the printer polling URL to the printer registration management unit 312 of the printers 110a, 110b (S1308). The each control unit 311 of the printers 110a, 110b transmits the user authentication URL to the registration application 351 (S1309) and initiates polling (S1310).

A description will be given of processing in S1311 to S1323 with reference to FIG. 17. When the registration application 351 confirms that the user authentication URL has been received from the each control unit 311 of the printers 110a, 110b, the registration application 351 instructs the Web browser 350 to access the user authentication URL that is common to the printers 110a, 110b (S1311). Then the Web browser 350 accesses the user authentication URL (S1312). In the print service 340, the image forming devices having the same group ID are associated and managed, and thus the registration processing of the printers 110a, 110b having the same group ID is executed only by one access to the user authentication URL by the Web browser 350. The authentication for the user account by the print service 340 is the same as that in S1011 described with reference to FIG. 8 (S1313).

In S1314, the print management unit 342 associates the user information with the printer information. Specifically, the print management unit 342 collectively associates the user account of which the authentication in the print service 340 has been successful with the one or more image forming devices that are associated by means of the group ID (FIG. 4B). Then, in S1315, the print management unit 342 prepares the printer authentication ticket for all the image forming devices (the printers 110a, 110b) that are associated by means of the group ID 407. From the processing in which the printer 110*a* acquires the printer authentication ticket (S1316) up to the processing of the access ticket acquisition (S1318) are the same as those from S1014 to S1016 of FIG. 8.

The registration application 351 monitors that the printer 110*a* acquires the access ticket from the print service 340 (S1319). Also, from the processing in which the printer 110*b* acquires the printer authentication ticket (S1320) up to the processing of the access ticket acquisition (S1323) are the same as those from S1023 to S1025 of FIG. 8. Next, the registration application 351 monitors that the printer 110*b* acquires the access ticket from (S1324) the print service 340. When detecting that the printers 110*a*, 110*b* have acquired the access ticket, respectively, in S1319 and S1323, the registration application 351 terminates the processing by determining that all the image forming devices have completed the registration on the print service 340.

As mentioned above, in the present embodiment, the registration application utilizes group ID distributed to the image forming device group 110 so that the print service 340 associates the image forming device group 110 with the group ID to manage them. In this manner, the image forming devices of the image forming device group 110 can be collectively associated with the user account and registered, resulting in a reduction of labor imposed on the registering processing in which a user registers the image forming device one by one according to the number of the printers. In addition, the Web browser does not need to perform the login processing for each image forming device, resulting in a simplified processing. Also, the print service manages the image forming devices with one user authentication URL without creating individual user authentication URL for each image forming device, resulting in a simplified processing on the print service side. Note that, the group ID is represented as "GrID" in FIG. 13.

Fifth Embodiment

In printer registration method in the fifth embodiment, the registration application 351 implements an access processing to the user authentication URL for a printer batch registration and transmits a printer list, so that a plurality of image forming devices can be collectively registered in the print service 340. With respect to the fifth embodiment, contents and modifications described in the first, second, third, and fourth embodiments can be applied to the fifth embodiment unless otherwise stated.

Figure 19:
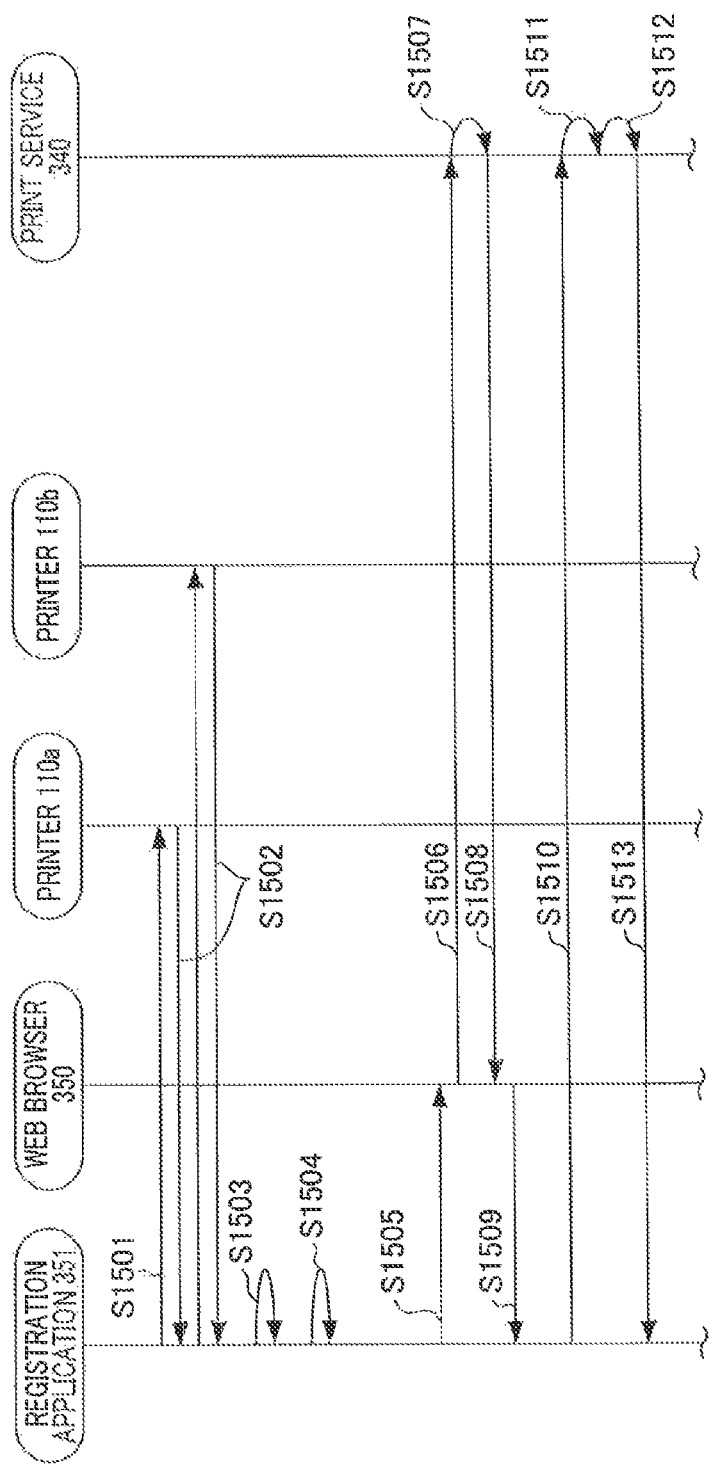
FIG. 19 illustrates processing for registering an image forming device on a print server in a fifth embodiment.
Figure 20:
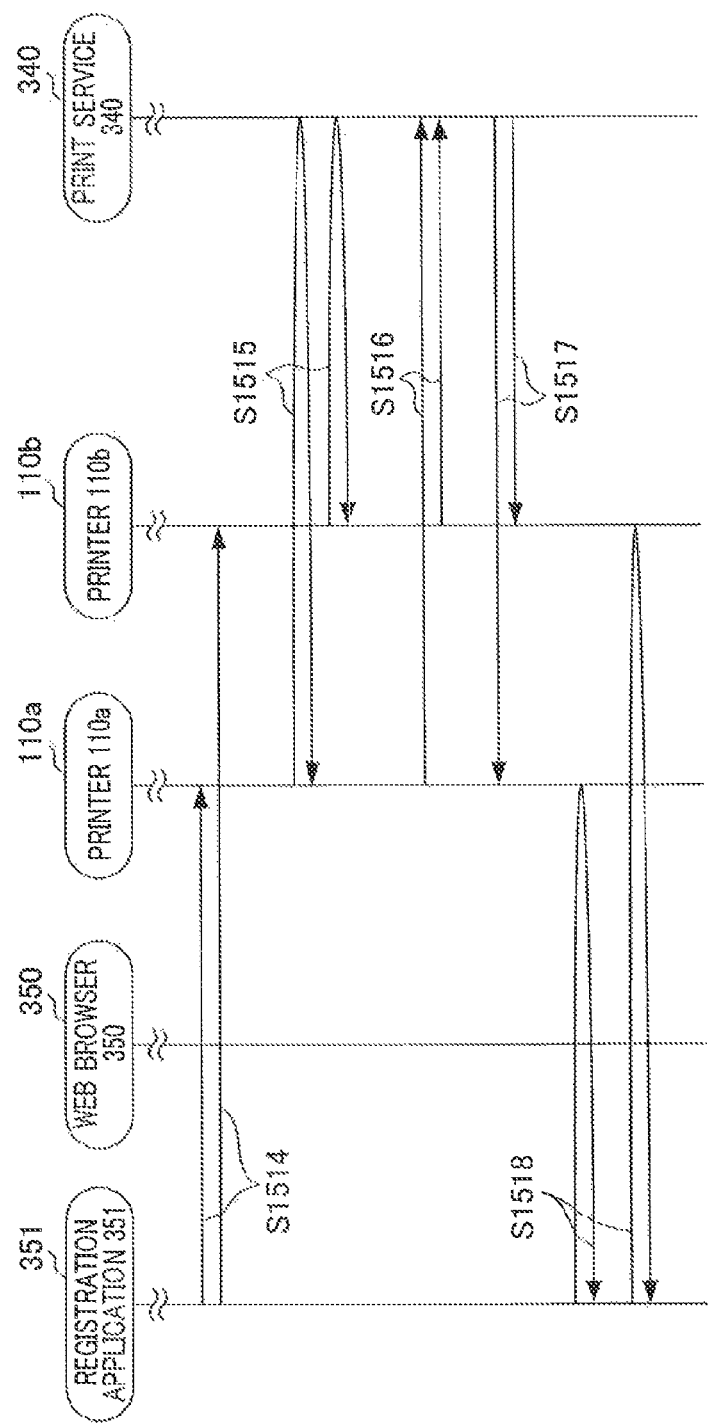
FIG. 20 illustrates processing for registering an image forming device on a print server in the fifth embodiment.

FIG. 19 and FIG. 20 are diagrams illustrating a method for registering the image forming device group 110 on the print service 340 in the fifth embodiment. The registration application 351 on the client 120 is activated, the user interface (FIG. 7A) for performing a printer search and instructing the print service 340 to perform printer registration application processing is displayed, and a printer search is instructed (S1501). In S1502, the printers 110*a*, 110*b* respond to a printer search. The registration application 351 creates the search result list (FIG. 18A) (S1503), and confirms the number of image forming devices that have been registered on the list (S1504).

The registration application 351 instructs the Web browser 350 to access a user authentication URL of the Web application 346 provided in the print service 340 and that has been prepared in advance (S1505). The Web browser 350 accesses the user authentication URL of the print service 340 in the same manner in S1010 of FIG. 8 (S1506). When the print service implements the user authentication in the same manner in S1011 of FIG. 8 and the authentication has been successful (S1507), the print service 340 transmits an authentication response to the Web browser 350 (S1508). The Web browser 350 transmits the authentication response to the registration application 351 (S1509).

Here, the registration application 351 transmits the search result list (FIG. 18A) as a printer list to the print service 340 (S1510). In other words, the registration application 351 functions as a provision unit that provides a list of the image forming devices that are targets to be registered on the print service 340 to the print service 340. Upon receipt of the search result list (FIG. 18A), the print service 340 associates the user account of which the user authentication has been successful with the printers registered on the search result list (FIG. 18A), and stores them in the information storage unit 341 (S1511, FIG. 4A). That is to say, in the fifth embodiment, the login processing into the print service 340 for each image forming device is not performed, but printer information of all the image forming devices are transmitted to the print service, and the printer registration application is executed when the authentication has been successful by the login processing. The print service 340 sets the printer authentication ticket to the printer polling URL in the same manner in S1013 of FIG. 8 (S1512), the print service 340 transmits the printer polling URL to the registration application 351 (S1513).

A description will be give of the processing from S1514 to S1518 with reference to FIG. 20. The registration application 351 transmits the printer polling URL the printers 110*a*, 110*b* registered on the search result list (S1514). Upon receipt of the printer polling URL, the each control unit 311 of the printers 110*a*, 110*b* initiates polling to the printer polling URL. Successive processing from S1515 to S1518 is the same as the access ticket acquisition processing from S1014 to S1017, and from S1023 to S1026 described in the first embodiment.

In this manner, the image forming devices of the image forming device group 110 can be collectively registered by associating each image forming device with the user account, resulting in a reduction of labor imposed on the registering processing in which a user registers the image forming device one by one according to the number of printers. Also, the Web browser does not need to perform the login processing for each image forming device, resulting in a simplified processing. Also, the print service can manage the image forming devices with one user authentication URL without creating an individual user authentication URL for each image forming device, resulting in a simplified processing in the print service.

Sixth Embodiment

In a sixth embodiment, assume that the registration application 351 described up to the fifth embodiment is present in the image forming device. A printer registration method in the sixth embodiment is a method in which the Web browser 350 outside the image forming device instructs the registration application 351 of the image forming device to perform the registration processing, and realizes a registration of a plurality of printers. Assume that the Web browser 350 is present in the one client 120.

Figure 21:
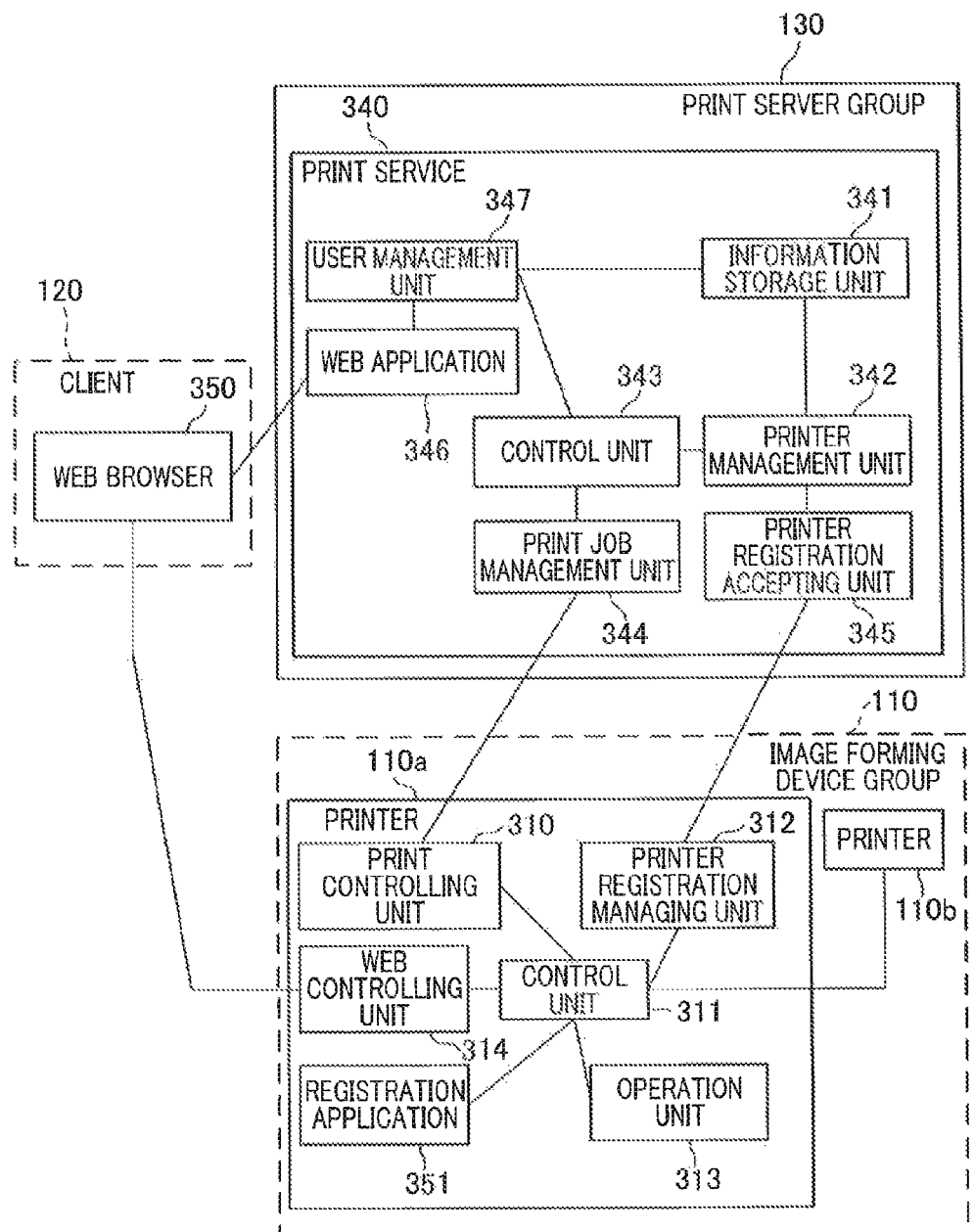
FIG. 21 illustrates a configuration example of a printing system in a sixth embodiment.

FIG. 21 is a diagram illustrating a configuration example of a printing system 1000 in the sixth embodiment. Unlike the configuration shown in FIG. 3, the client 120 does not include the registration application 351. On the other hand, the printer 110*a* includes the registration application 351 and a Web controlling unit 314. The Web controlling unit 314 generates a screen for accepting an operation instruction from the Web browser 350 and controls communication with the Web browser 350. When the operation instruction from the Web browser 350 is a printer registration instruction by which the registration application 351 registers a printer on the print service 340, the Web controlling unit 314 passes the instruction to the registration application 351 via the control unit 311. The registration application 351 of the printer 110a that has received the printer registration instruction not only instruct the printer search for printers on the network 100 to the control unit 311 but also causes the searched out printer 110b to initiate the registration processing to the print service 340. The configuration of the printer 110b is the same that of the printer 110a. However, in the present embodiment, the registration application 351 of the printer 110b does not execute processing, the configuration of the printer 110b may be the same configuration as the image forming device described with reference to FIG. 3. Note that functions of other units are the same as those of units described in the first embodiment, thus descriptions of these functions are omitted.

Figure 22A:
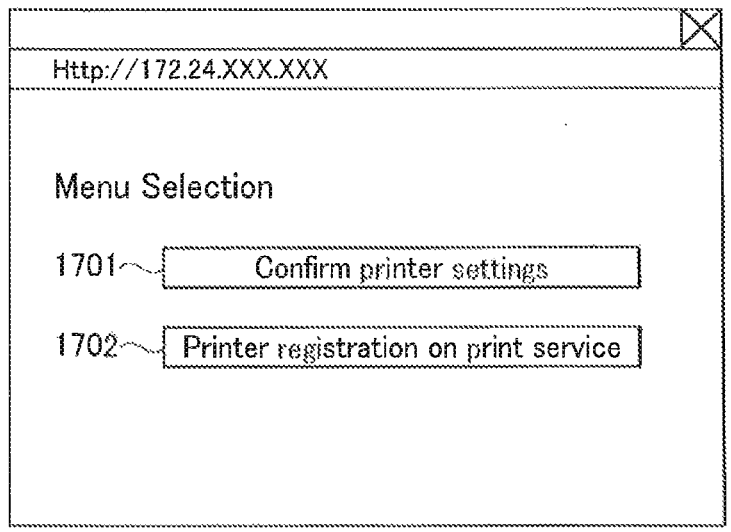
FIG. 22A illustrates screen represented on a Web browser by the image forming device.
Figure 23:
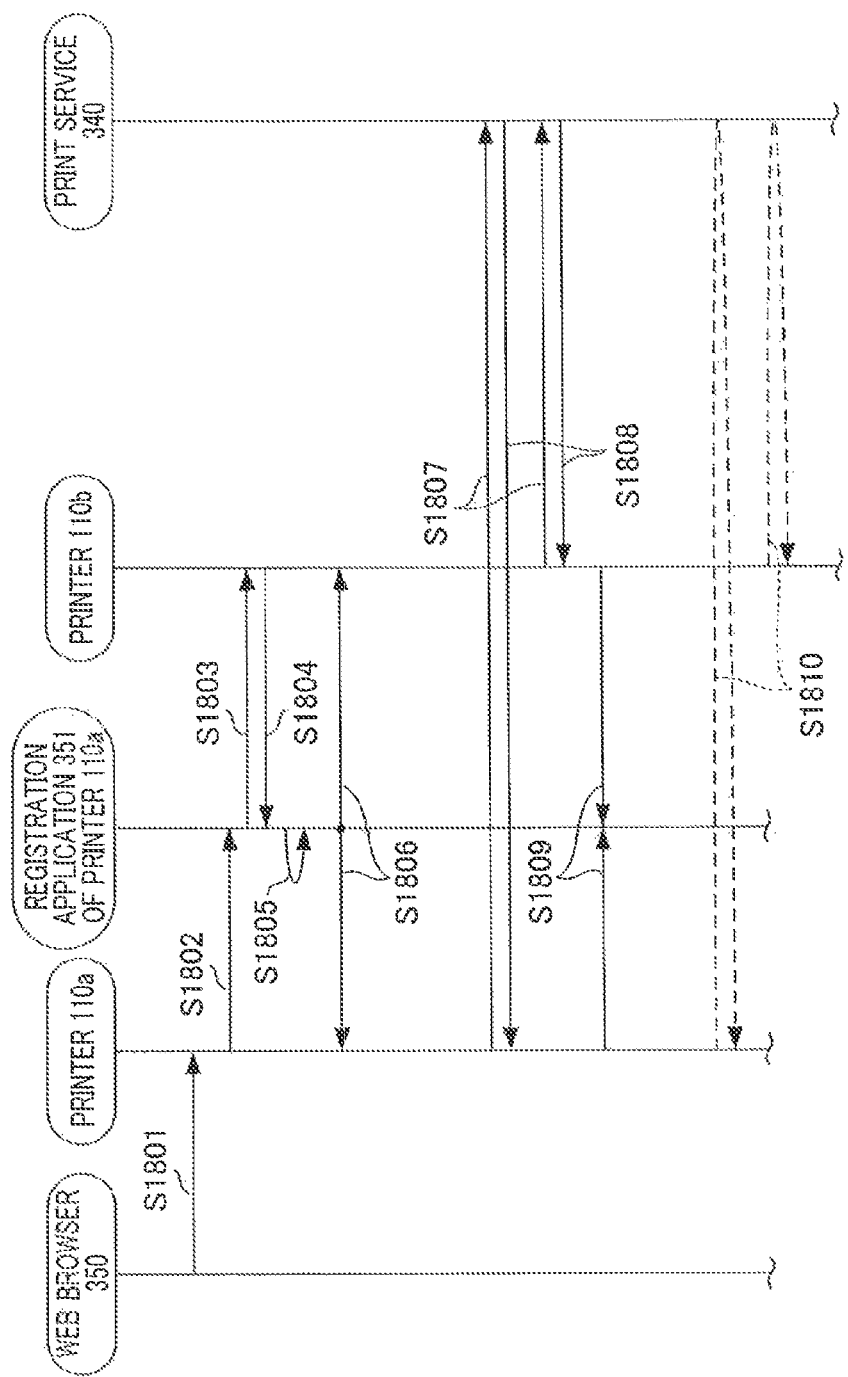
FIG. 23 illustrates processing for registering an image forming device to a print server in the sixth embodiment.
Figure 24:
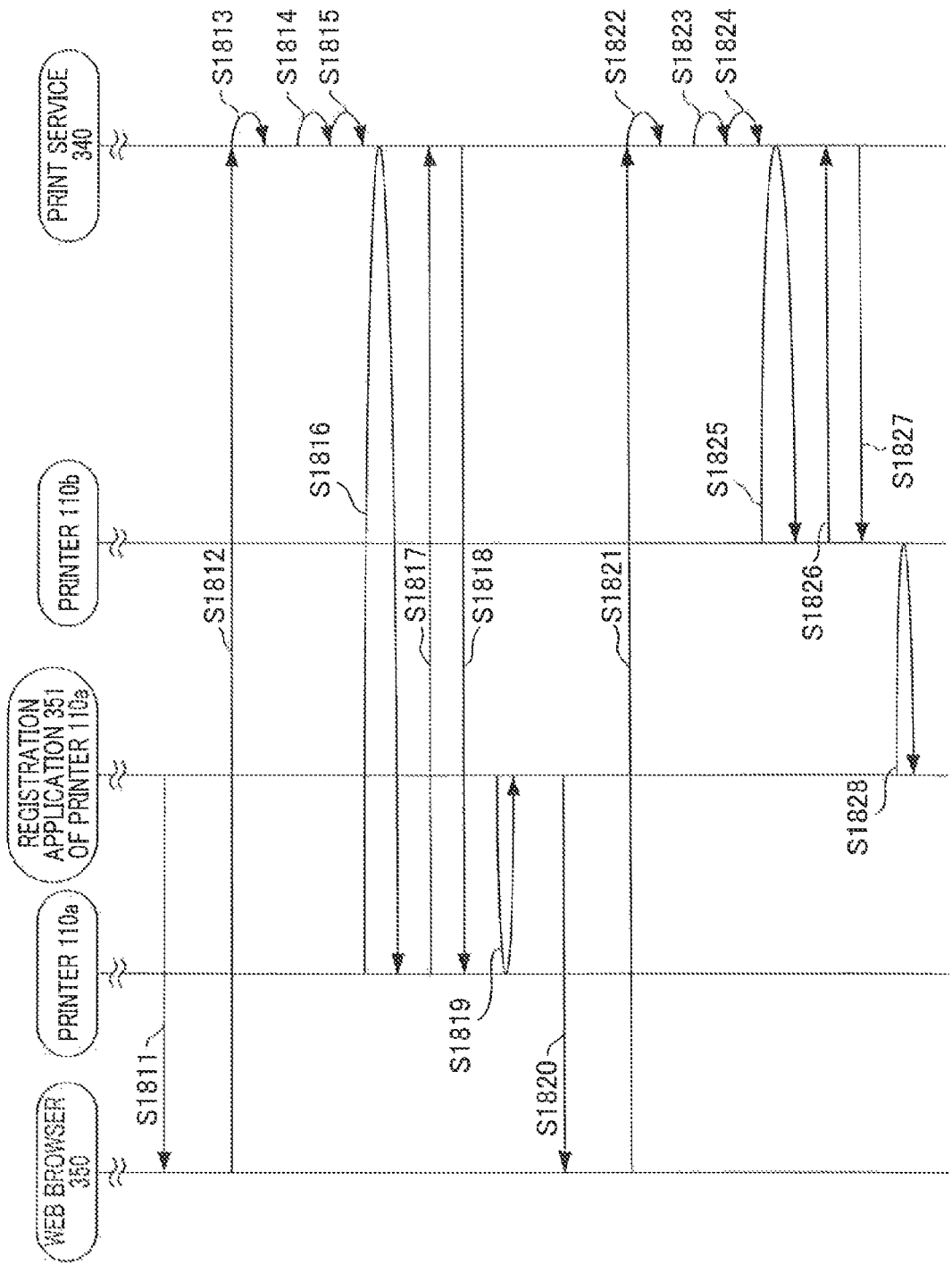
FIG. 24 illustrates processing for registering an image forming device on a print server in the sixth embodiment.

FIG. 23 and FIG. 24 are diagrams illustrating a method for registering the image forming device group 110 to the print service 340 in the sixth embodiment. The Web browser 350 accesses the printer 110a. The Web controlling unit 314 of the printer 110a transmits a screen shown in FIG. 22A to the Web browser 350. FIG. 22A shows a menu screen for performing an operation instruction from the device outside the printer to the printer by operating the Web browser 350 and causing a user to select the type of operation instruction. The screen shown in FIG. 22A includes, for example, a button 1701 for confirming printer settings and a button 1702 for registering the image forming device on the print service. In the present embodiment, assume that the button 1702 for registering the image forming device to the print service has been pressed by a user operation.

Figure 22B:
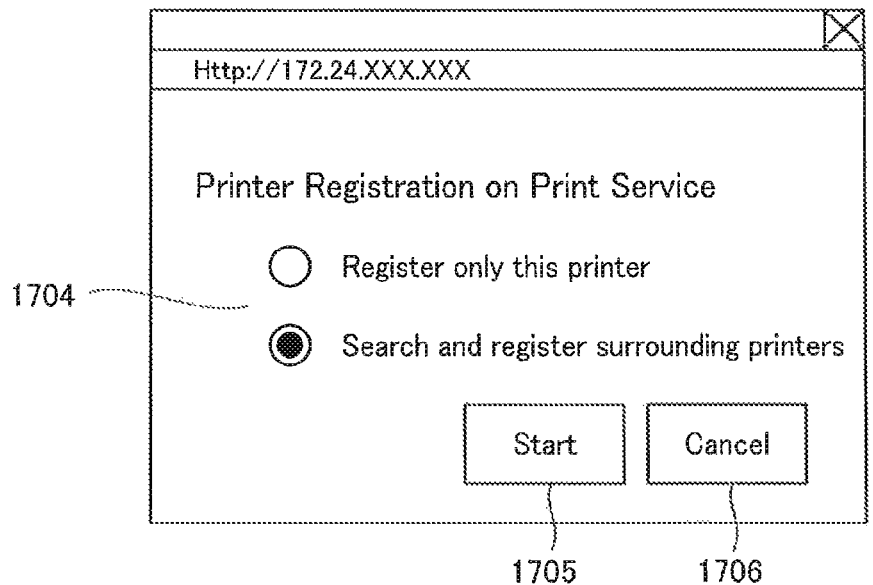
FIG. 22B illustrates screen represented on a Web browser by the image forming device.

The Web controlling unit 314 transmits a screen shown in FIG. 22B to the Web browser 350. FIG. 22B is a screen for instructing a printer registration on the print service 340 by operating the Web browser 350. The screen shown in FIG. 22B includes a registration method selecting means 1704 for confirming how to implement the printer registration to the print service, and a start button 1705 for issuing an instruction for a start of the processing in accordance with the selected registration method. The screen shown in FIG. 22B also includes a cancel button 1706 for cancelling the printer registration processing on the print service 340. When the cancel button 1706 is pressed on the screen shown in FIG. 22B, the Web controlling unit 314 redisplays the screen of FIG. 22A so that a user reselects the content of the operation instruction to the printer. In this example, assume that a method "register only this printer" has been selected by the registration method selecting means 1704 and by a user operation, then the start button 1705 is pressed. In this manner, the Web browser 350 instructs the printer 110a to activate the registration application 351 (S1801).

The Web controlling unit 314 of the printer 110a instructs the registration application 351 contained inside the printer 110a to activate (S1802). Since the method "register only this printer" is designated, the registration application 351 does not implement the printer search, but registers only the printer 110a on the list (FIG. 18A), and checks the number of printers (S1805). Subsequent processing from S1806 to S1819 is the same as that from S1004 to S1017 of FIG. 8 described in the first embodiment.

While a method "search and register other surrounding printers" is selected on the screen of FIG. 22B, and the start button 1705 is pressed, the registration application 351 that has been activated in S1802 searches for printers on the network 100 (S1803). The processing from S1803 to S1828 is the same as the printer registration processing of FIG. 8.

Also, when the method "search and register other surrounding printers" is designated on the screen shown in FIG. 22B, the registration application 351 may allow a user to select one or more printers. In this case, after creating the search result list shown in FIG. 18A in S1805, the registration application 351 causes the Web controlling unit 314 to generate a screen shown in FIG. 22C based on the search result list and transmit the generated screen to the Web browser 350. The screen shown in FIG. 22C includes a printer selection portion 1707, a registration button 1708 for issuing an instruction for a registration start to the selected printer, and a cancel button 1709 for cancelling the printer registration processing.

Upon detection of the pressing of the registration button 1708 by a user operation, the Web browser 350 transmits the printer information of the printer selected in printer selection portion 1707 to the registration application 351. The registration application 351 updates the search result list of FIG. 18A such that only the selected printer is registered. Then the registration application 351 implements the processing in S1806 on the printers registered on the search result list. In this case, assume that the printer 110a and the printer 110b are selected on the screen of FIG. 22C. As shown in FIG. 23 and FIG. 24, the processing from S1806 to S1828 is the same as that from 1004 to S1026 of FIG. 8.

According to the method in this embodiment, in the embodiment where the image forming device has the registration application 351, and the printer registration is instructed by operating the Web browser 350, a plurality of image forming devices can be searched and registered on the print service 340 in order.

Seventh Embodiment

A printer registration method in a seventh embodiment is a method in which the registration application 351 is present in the image forming device, and a registration of a plurality of image forming devices is realized by a panel operation of the image forming device. By operating a panel (the operation unit 313) of one image forming device (the printer 110a), the registration application 351 of this image forming device is activated. The registration application 351 of the printer 110a instructs the registration application 351 surrounding printers (the printer 110b) on the network 100 to perform the printer registration in conjunction with the printer 110a. In this manner, the printers 110a and 110b of the image forming device group 110 implement the printer registration processing on the print service 340. Note that, the registration application 351 of the printer 110b neither searches for other image forming devices nor instructs the printer registration to the registration application 351 of the other image forming devices.

Figure 25:
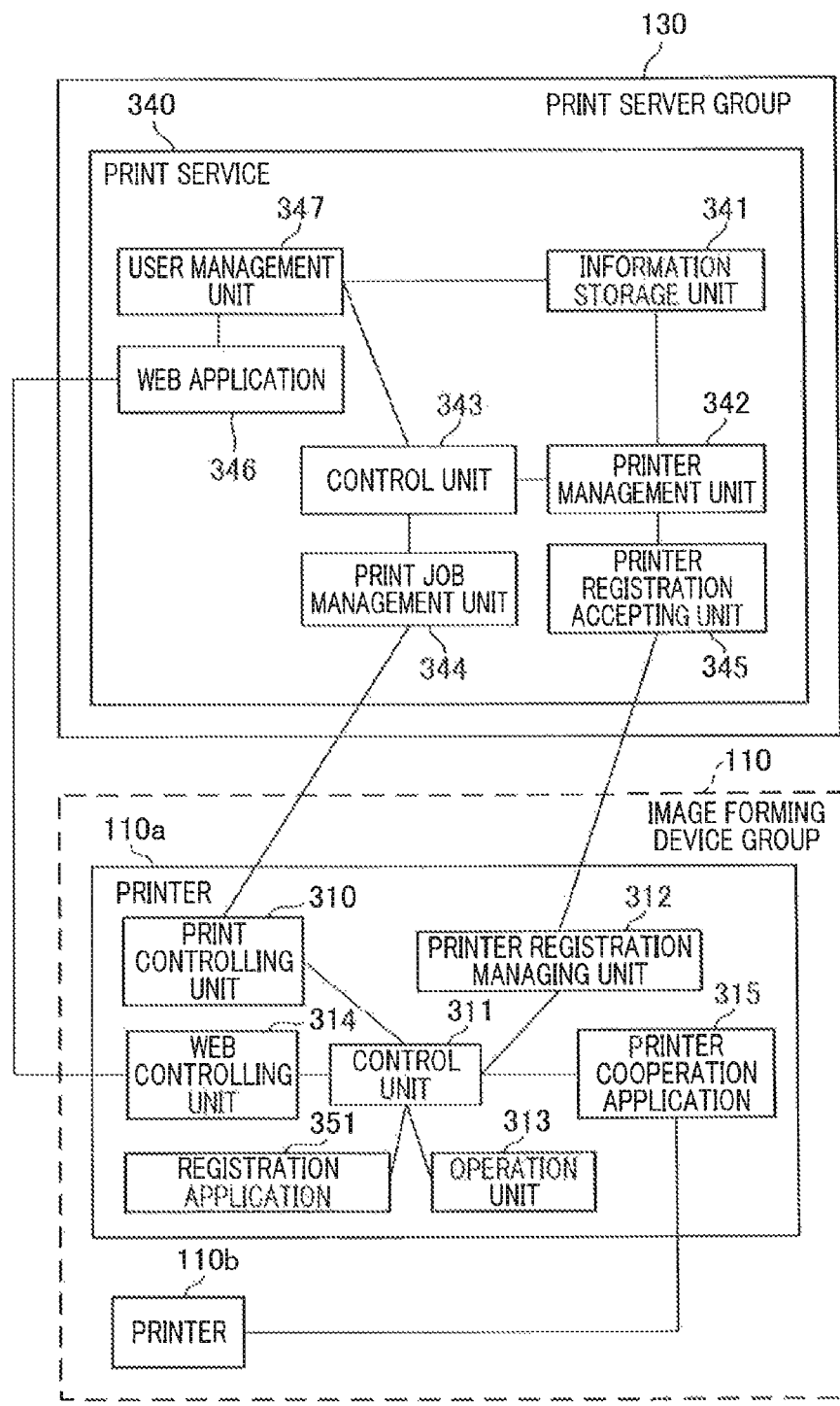
FIG. 25 illustrates a configuration example of a printing system in a seventh embodiment.

FIG. 25 is a diagram illustrating a configuration of a printing system 1000 in the seventh embodiment. Unlike the configuration shown in FIG. 3 and FIG. 21, the printing system 1000 does not include the client 120. The printer 110a further includes a printer cooperation application 315 (hereinafter referred to as a "cooperation application 315") in addition to the configuration of the image forming device described with reference to FIG. 21. The printer 110a includes a browser function, the Web controlling unit 314 controls this browser function. The Web controlling unit 314 provides a user interface of the browser via the operation unit 313. This browser function is utilized for a user authentication in the print service 340 in a user login operation. The Web controlling unit 314 communicates with the Web application 346 of the print service 340. The printer cooperation application 315 controls synchronization with printers on the network 100 and a data exchange. The printer cooperation application 315 also functions as an instruction unit, and instructs a plurality of image forming devices that have been retrieved to execute processing which a own device executes in response to the accepted request in conjunction with the own device whenever the own device executes the processing. The printer cooperation by the cooperation applications 315 of the printers 110a and 110b includes cooperation in which the printer 110a passes user operation information to the printer 110b such that control is carried out so that the printer 110b performs the same operation in synchronization. Also, functions of other units are the same as those of the units described in the first embodiment, and thus, descriptions of these functions are omitted.

Figure 26A:
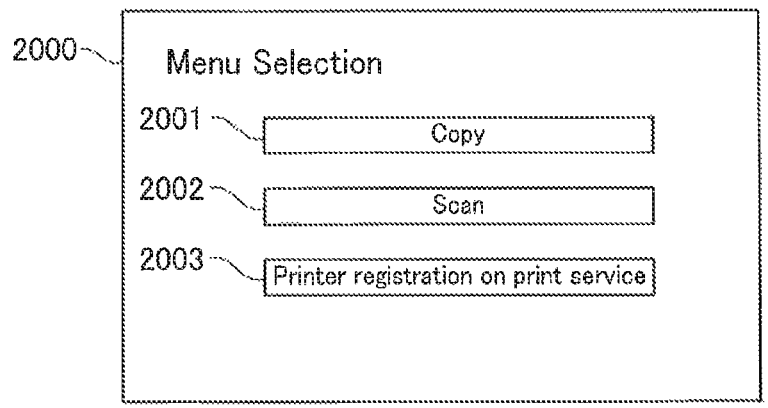
FIG. 26A illustrates user interfaces displayed on a panel of an image forming device.
Figure 26B:
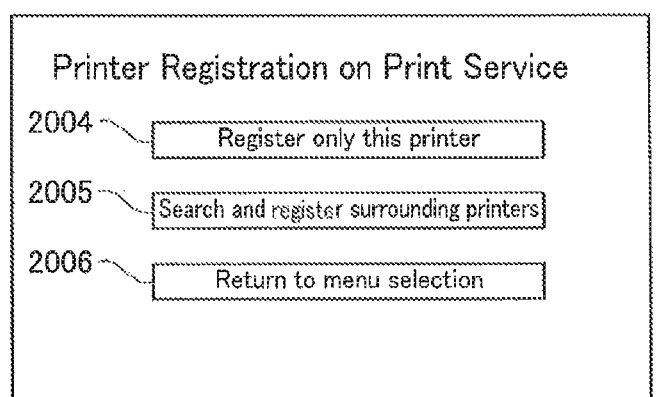
FIG. 26B illustrates user interfaces displayed on a panel of an image forming device.
Figure 27:
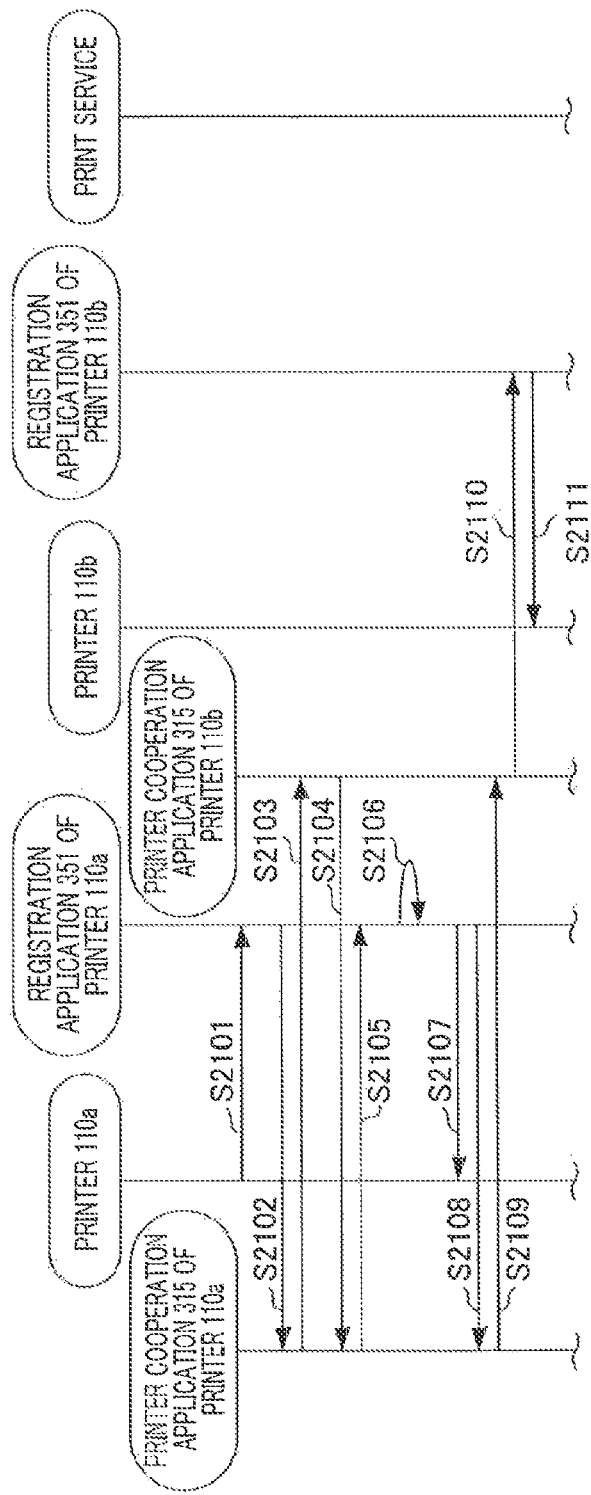
FIG. 27 illustrates processing for registering an image forming device on a print server in the seventh embodiment.
Figure 28:
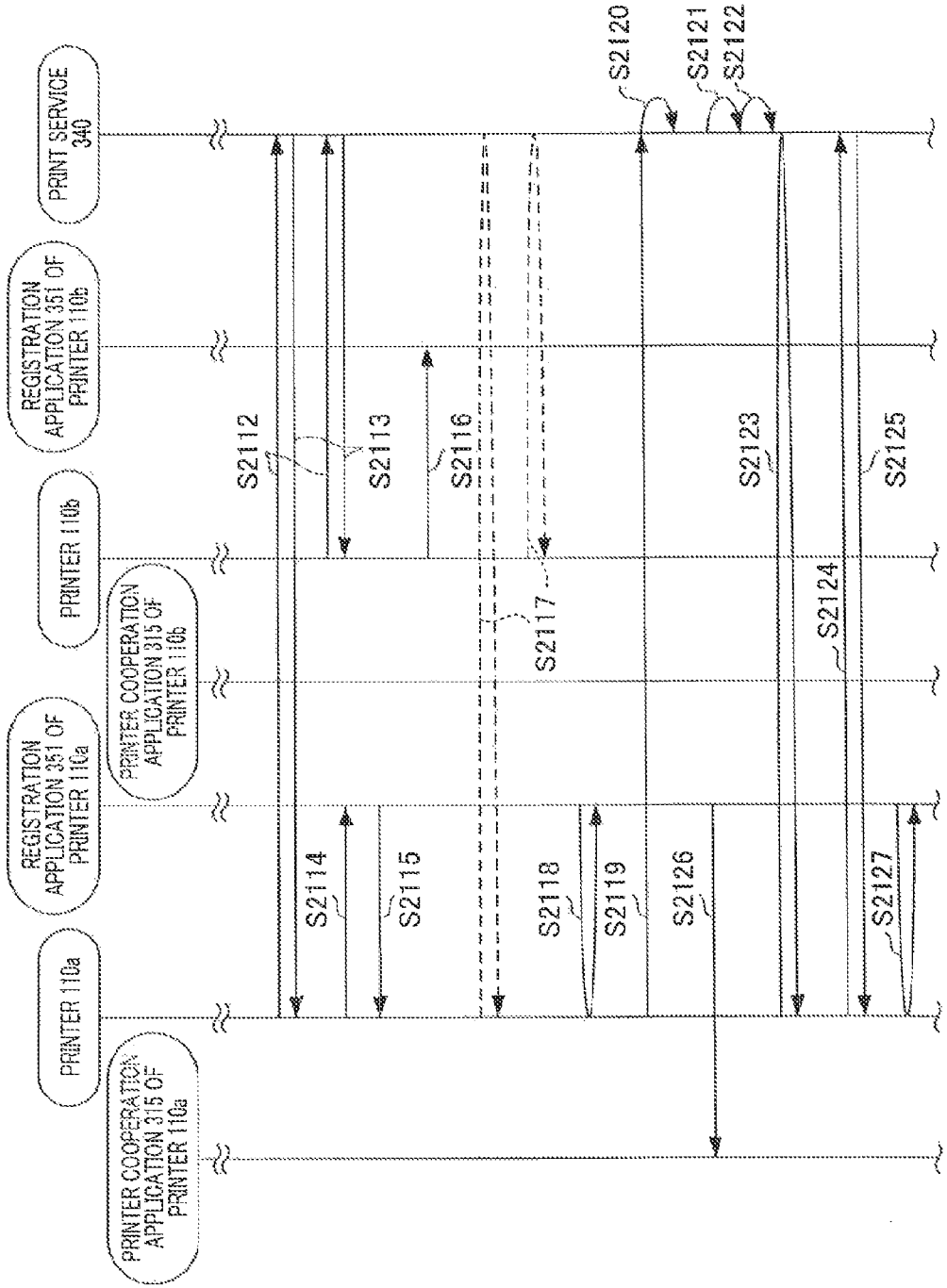
FIG. 28 illustrates processing for registering an image forming device on a print server in the seventh embodiment.
Figure 29:
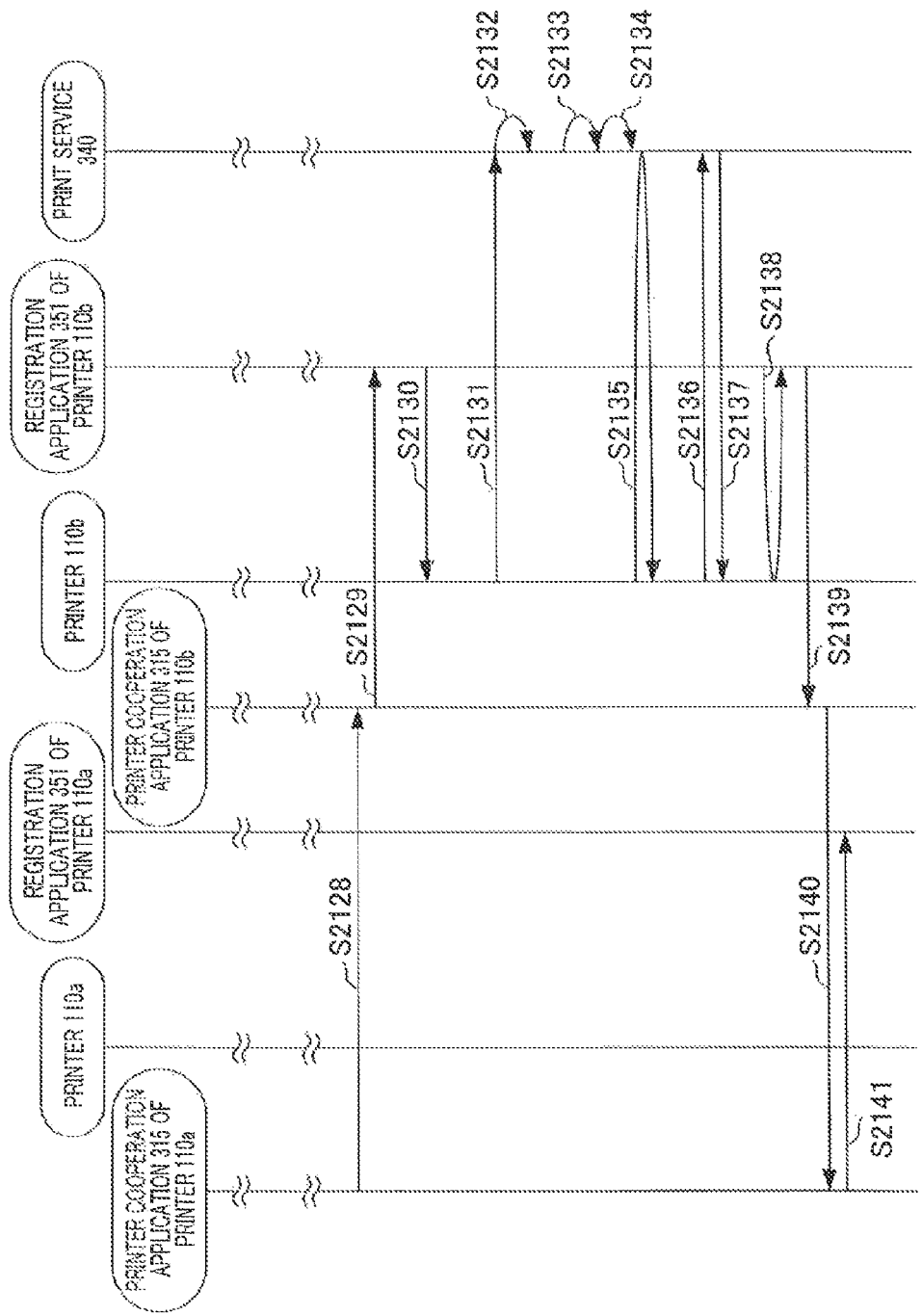
FIG. 29 illustrates processing for registering an image forming device on a print server in the seventh embodiment.

FIG. 27, FIG. 28, and FIG. 29 are diagrams illustrating a method for registering the image forming device group 110 on the print service 340 in the seventh embodiment. A screen as shown in FIG. 26A is displayed on the panel of the printer 110a. FIG. 26A shows a user interface for allowing a user to select functions provided in the image forming device. Firstly, a menu selection screen is displayed on a panel screen 2000, and includes buttons for selecting functions provided in the image forming device such as a copy button 2001 and a scan button 2002, and a printer registration button 2003 for registering one or more image forming devices on the print service 340. When printer registration button 2003 for the print service 340 is pressed by a user operation, the operation unit 313 acquires a screen shown in FIG. 226B from the Web controlling unit 314, and displays it on the panel. On the screen shown in FIG. 26B, a user can select a printer registration method for the print service 340. The screen shown in FIG. 26B includes a registration button 2004 for "registering only this printer", a registration button 2005 for "searching and registering surrounding printers", a button 2006 for "returning to the menu selection" of FIG. 26A.

When the registration button 2004 for "registering only this printer" is pressed by a user operation, the operation unit 313 instructs the registration application 351 of the printer 110a to activate (S2101). Since the method indicating "registering only this printer" is selected, the registration application 351 does not implement a printer search, registers only the printer 110a on the search result list (FIG. 18A), and checks the number of printers (S2106). Subsequently, the processing of S2107, S2112 to S2115, S2117, S2119 to S2125, and S2127 is implemented (See FIG. 28). This processing is the same as printer registration processing of the first printer from S1004 to S1017 of FIG. 8 described in the first embodiment. In the case where the selected registration button 2004 for "registering only this printer" is pressed, the registration application 351 determines that there is one image forming device to be registered, and may omit the check of the number of the printers.

On the other hand, when the registration button 2005 for "searching and registering surrounding printers" is pressed on the screen shown in FIG. 26B, the operation unit 313 instructs the registration application 351 to activate (S2101), and searches printers on the network 100 (S2102). At this time, the registration application 351 of the printer 110a instructs the cooperation application 315 of the printer 110a to perform a printer search (S2105). The cooperation application 315 of the printer 110a implements the printer search to the one or more cooperation application 315 of the image forming device group 110 on the network 100 (S2103).

The cooperation application 315 of the printer 110b transmits a response to the printer search to the cooperation application 315 of the printer 110a (S2104). The cooperation application 315 of the printer 110a transmits the response to the printer search to the registration application 351 of the printer 110a (S2105). The registration application 351 of the printer 110a creates the search result list shown in FIG. 18A, and checks the number of the printers (S2106). In the present embodiment, assume that the printer 110a and the printer 110b have been registered on the search result list.

The registration application 351 of the printer 110a instructs the printer 110a to access the registration application URL (S2107). At this time, in S2108, the registration application 351 of the printer 110a causing the cooperation application 315 of the printer 110a to transmit to an image forming device other than the printer 110a (the printer 110b), an instruction for accessing the registration application URL by the image forming device (the printer 110b).

The cooperation application 315 of the printer 110a transmits an access instruction for accessing the registration application URL to the cooperation application 315 of the printer 110b (S2109). In other words, the cooperation application 315 of each printer functions as a receipt unit, and executes receiving processing of receiving location information for accessing the print service corresponding to the own device by transmitting a registration request to the print service 340. The cooperation application 315 of the printer 110b transmits the access instruction for accessing the registration application URL to the registration application 351 of the printer 110b (S2110). The registration application 351 of the printer 110b instructs the printer 110b to access the registration application URL (S2111). Through this processing, both printers 110a and 110b can access the registration application URL. The respective printers 110a and 110b access the registration application URL via the printer registration management unit 312 so as to implement the printer registration application to the print service 340 (S2112). Then, the print management unit 342 of the print service 340 transmits the user authentication URL, the printer authentication ticket, and the printer polling URL to the printers 110a, 110b (S2113). The printers 110a, 110b may initiate polling to the print service 340 (S2117).

The printer 110a in S2114, and the printer 110b in S2116 transmit the user authentication URL to the respective registration applications 351 of own printers. In the case of the printer 110a, the registration application 351 instructs the Web controlling unit 314 to access the user authentication URL of the printer 110a (S2115). In the case of the printer 110b, the registration application 351 instructs the Web controlling unit 314 to the user authentication URL of the printer 110b after waiting for the processing in S2129 (described below in S2130). The reason is that the printer 110b itself cannot acquire the user account and the password.

The registration application 351 of the printer 110a that has implemented the processing in S2115 monitors operation information to the panel (the operation unit 313) by a user (S2118). Upon receipt of the instruction in S2115, the Web controlling unit 314 of the printer 110a accesses the user authentication URL (S2119). At this time, the Web controlling unit 314 acquires the login screen (FIG. 5) from the Web application 346 of the print service 340, and transmits the user account 405 and the password 406 input by the user operation to the print service 340. The user account 405 and the password 406 input by the user operation are retained by monitoring by the registration application 351 of the printer 110a in S2118.

The Web application 346 that has received the user account 405 and the password 406 implements authentication (S2120). The processing after the authentication of the printer 110a in the print service 340 is described below in S2121. Note that, the processing in S2120 by the print service 340 may be implemented after the print service 340 transmits the screen as shown in FIG. 6 to the Web controlling unit 314 and receives the printer registration instruction from the Web controlling unit 314 based on a user operation to the operation unit 313. By the processing in S2118, the registration application 351 of the printer 110a also monitors and retains the operation information with respect to the screen of FIG. 6. The registration application 351 of the printer 110a transmits predetermined operation information when having received it to the cooperation application 315 of the printer 110a and instructs it to transmit the information to the printers registered on the search result list (S2126). The predetermined operation information is operation information that has been retrained in the aforementioned S2118.

A description will be given of the processing after S2128 with reference to FIG. 29. The cooperation application 315 of the printer 110a transmits the operation information to the cooperation application 315 of the printer 110b registered on the search result list (S2128). The cooperation application 315 of the printer 110b transmits the operation information to the registration application 351 of the printer 110b (S2129). Upon receipt of the operation information input with the printer 110a, the registration application 351 of the printer 110b that has completed the processing up to S2116 instructs the Web controlling unit 314 of the printer 110b to access the user authentication URL the printer 110b (S2130). The Web controlling unit 314 the printer 110b accesses the user authentication URL of the printer 110b (S2131). The Web controlling unit 314 of the printer 110b acquires the login screen (FIG. 5) from the print service 340, automatically inputs the operation information (the user account 405 and the password 406) acquired in S2129, and transmits it to the print service 340. Then, the print service 340 implements an authentication (S2132). In other words, the registration application 351 of the printer 110b functions as an access unit, and performs accessing processing of accessing along with authentication information input through the authentication screen based on the user authentication URL upon receipt of an access request for accessing the print service 340. In S2132, when the print service 340 provides the printer registration screen as shown in FIG. 6, the Web controlling unit 314 of the printer 110b transmits an instruction for performing the printer registration on the print service 340 by using the operation information (a printer registration instruction operation) acquired in S2129.

In the authentication processing of S2120 and S2132, when the authentication has been successful in the print service 340, the print management unit 342 of the print service 340 implements processing of associating the respective user information with the respective printer information in S2121 and S2133. The processing from S2121 to S2125 (the access ticket issuance), and S2127 (the access ticket acquisition monitoring) is the same as that described with reference to FIG. 8. Also, the processing from S2133 to S2138 (access ticket issuance) is the same as that described with reference to FIG. 8.

However, the registration application 351 of the printer 110b that has detected the access ticket issuance by the print service 340 in S2138 should transmit information indicating that the printer 110b has acquired the access ticket to the printer 110a. For this purpose, the registration application 351 of the printer 110b transmits the access ticket acquisition information to the cooperation application 315 of the printer 110b (S2139). The cooperation application 315 of the printer 110b transmits the access ticket acquisition information by the printer 110b to the cooperation application 315 of the printer 110a (S2140). The cooperation application 315 of the printer 110a transmits the access ticket acquisition information by the printer 110b to the registration application 351 of the printer 110a (S2141). The registration application 351 of the printer 110a implements close processing of the registration application 351 at the time the access ticket acquisition has been detected in S2141, while the registration application 351 of the printer 110b implements end processing of the registration application 351 at the time the processing in S2139 has been implemented.

In this manner, in the case where printers cooperate with each other so as to share and utilize printer registration information, the plurality of image forming device in the image forming device group 110 can be registered on the print service 340 by associating them with the user account. In the configuration where each the image forming device of the image forming device group 110 has the registration application 351, the each image forming device shares and utilizes the operation on the printer panel, a user can reduce the labor imposed on registration operations in which the user registers the image forming device one by one according to the number of printers. In the present embodiment, by the processing in S2118, S2126, S2128, S2129, the panel operation information by the user is passed from the printer 110a to the printer 110b, the printer 110b utilized the operation information.

Figure 26C:
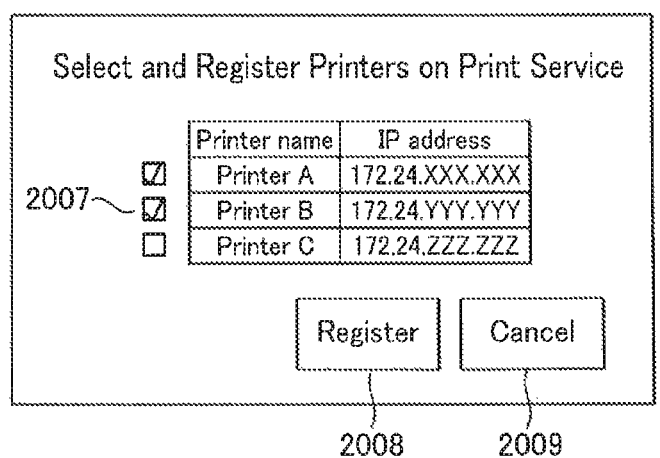
FIG. 26C illustrates user interfaces displayed on a panel of an image forming device.

When "search and register other surrounding device" is designated on the screen of FIG. 26B, the registration application 351 of the printer 110a may allow a user to select one or more printers. In this case, after creating the search result list of FIG. 18A in S2106, the registration application 351 causes the Web controlling unit 314 to create a screen of FIG. 26C based on the search result list, and display it on the panel of the printer 110a. A screen shown in FIG. 26C includes a printer selection portion 2007, a registration button 2008 for instructing the selected printer to start a registration, and a cancel button 2009 for cancelling the printer registration processing. Upon detection of a press of the registration button 2008 by a user operation, the operation unit 313 transmits printer information of the selected printer in the printer selection portion 2007 to the registration application 351. The registration application 351 updates the search result list of FIG. 18A so that only the selected printer in the screen of FIG. 26C is registered, and implements the processing in S2107 and S2108 to the printer registered on the search result list. The processing after the processing in S2107, the aforementioned processing is performed. In this example, FIG. 26C assumes that the printer 110a and the printer 110b have been selected on the screen of FIG. 26C.

Aspects of the present invention can also be realized by a computer of a system or device (or devices such as a CPU or MPU) that reads out and executes a program recorded on a memory device to perform the functions of the above-described embodiments, and by a method, the steps of which are performed by a computer of a system or device by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-164027 filed Jul. 24, 2012, which is hereby incorporated by reference herein in its entirety.

The invention claimed is:

1. An information processing device that is communicable with a service providing device that provides a print service and an image forming device that executes printing by using the print service, comprising:
a selection unit configured to accept a selection of at least one or more image forming devices that are targets to be registered from among a plurality of image forming devices;
a transmission unit configured to transmit, to each of the selected image forming devices, a registration request on the service providing device in response to the acceptance of the selection by the selection unit and reception of an instruction for registration;
a receipt unit configured to receive, from each of the selected image forming devices that have accepted the registration request, location information for accessing the service providing device corresponding to each image forming device; and
a display unit configured to receive and display an authentication screen for inputting authentication information by accessing the service providing device based on the received location information,
wherein user information corresponding to the authentication and each of the selected image forming devices are associated with each other and managed by the service providing device after the authentication information is input on the displayed authentication screen.

2. The information processing device according to claim 1, wherein, after displaying the authentication screen corresponding to a first image forming device among the selected image forming devices, the display unit does not display the authentication screen corresponding to a second image forming device that is to be registered subsequent to the first image forming device, and
wherein the second image forming device is associated with the user information corresponding to the authentication information and managed by the service providing device through access, by the second image forming device, to the service providing device along with the authentication information input on the authentication screen corresponding to the first image forming device.

3. The information processing device according to claim 1, further comprising a confirmation unit configured to confirm whether the selected image forming device have been registered on the service providing device,
wherein, when the selected image forming device have acquired access information for accessing the service providing device which the service providing device issues upon completion of registration of the selected image forming devices, the confirmation unit determines that the selected image forming devices have been registered on the service providing device, and
wherein, when the confirmation unit determines that the selected image forming devices have been registered, the transmission unit accesses the service providing device along with the input authentication information in order to register a next image forming device.

4. The information processing device according to claim 3, further comprising a search unit configured to search a plurality of image forming devices that are connected via a network,
wherein the display unit displays a selection screen for selecting whether to cause all the plurality of image forming devices that have been retrieved by the search unit to execute the registration request on the service providing device or to cause the selected image forming devices to execute the registration request on the service providing device; and
wherein the display device further displays a registration completion screen when the confirmation device determines that all the image forming devices or the selected one or more image forming devices have been registered on the service providing device.

5. The information processing device according to claim 1, wherein the transmission unit transmits, to the each of the selected image forming device, the registration request having identification information of an image forming device group including the plurality of image forming device that are targets to be registered on the service providing device, and
wherein each selected image forming device included in the plurality of image forming devices and the identification information are associated and managed by the service providing device through access from the plurality of image forming devices that have responded to the registration request to the service providing device, and after the authentication information has been input on the authentication screen corresponding to one image forming device to be registered, the user information corresponding to the authentication information and each image forming device corresponding to the identification information are associated with the image forming device group.

6. An information processing device that is communicable with a service providing device that provides a print service and an image forming device that executes printing by using the print service, comprising:
a selection unit configured to accept a selection of at least one or more image forming devices that are targets to be registered from among a plurality of image forming devices;
a transmission unit configured to transmit, to each of the selected image forming devices, a registration request on the service providing device in response to the acceptance of the selection by the selection unit and reception of an instruction for registration;
a receipt unit configured to receive, from each of the selected image forming devices that have accepted the registration request, location information for accessing the service providing device and that corresponds to each image forming device; and
a presentation unit configured to present an authentication screen for performing an authentication request to the service providing device,
wherein the transmission unit further accesses the service providing device with authentication information based on the location information that has been acquired by authentication information input on the authentication screen so that user information corresponding to the authentication information and each of the selected image forming devices are associated with each other and managed by the service providing device.

7. An information processing device that is communicable with a service providing device that provides a print service and an image forming device that executes printing by using the print service, comprising:
a selection unit configured to accept a selection of at least one or more image forming devices that are targets to be registered from among a plurality of image forming devices;

an access unit configured to access, in response to the acceptance of the selection by the selection unit and reception of an instruction for registration, the service providing device with an authentication information based on predetermined location information for accessing the service providing device and that is used in order to register each of the selected image forming devices on the service providing device; and a provision unit configured to provide the service providing device with a list of the image forming devices that are targets to be registered on the service providing device, wherein user information corresponding to the authentication information and the image forming devices included in the list are associated with each other and managed by the service providing device that has been accessed with the authentication information.

8. An image forming device that executes printing by using a service providing device that provides a print service via a network, comprising:

a search unit configured to search for a plurality of image forming devices that are connected via the network upon receipt of a request from an information processing device;

a selection unit configured to accept a selection of at least one or more image forming devices that are targets to be registered from among the plurality of image forming devices searched by the search unit;

a transmission unit configured to transmit a registration request on the service providing device to each of the selected image forming devices in response to the acceptance of the selection by the selection unit and reception of an instruction for registration;

a receipt unit configured to receive, from each of the image forming devices that have accepted the registration request, location information for accessing the service providing device and that corresponds to each image forming device; and an instruction unit configured to instruct the information processing device to access the service providing device based on the received location information, and to request an authentication screen for inputting authentication information, wherein, after authentication information is input on the authentication screen displayed by the information processing device, user information corresponding to the authentication information and each of the selected image forming devices are associated with each other and managed by the service providing device.

9. An image forming device that executes printing by using a service providing device that provides a print service via a network, comprising:

a search unit configured to search for a plurality of image forming devices that are connected via the network;

a selection unit configured to accept a selection of at least one or more image forming devices that are targets to b registered from among a plurality of image forming devices;

an instruction unit configured to instruct, in response to the acceptance of the selection by the selection unit and reception of an instruction for registration, each of the selected image forming devices to execute processing performed by a own device in response to an accepted request in conjunction with the own device whenever the own device executes the processing;

a receipt unit configured to accept a registration request of the own device and execute receiving processing of receiving location information for accessing the service providing device and that corresponds to the own device by transmitting the registration request to the service providing device;

a display unit configured to receive and display an authentication screen for inputting authentication information by accessing the service providing device based on the received location information; and an access unit configured to execute access processing of accessing the service providing device along with the authentication information input on the authentication screen based on the location information upon receipt of an access request to the service providing device, wherein when the access processing has been executed by the own device, the instruction unit instructs the each image forming device that has executed the receiving processing in conjunction with the own device to execute access processing to the service providing device by providing the authentication information input in the access processing by the own device, and wherein user information corresponding to the authentication information and each of the selected image forming devices are associated with each other and managed by the service providing device.

10. A method for controlling a printing system that comprises a service providing device that provides a print service, an image forming device that executes printing by utilizing the service providing device, and an information processing device that is communicable with the image forming device and the service providing device, comprising:

accepting, by the information processing device, a selection of at least one or more image forming device that are targets to be registered from among a plurality of image forming devices;

transmitting, by the information processing device, to each of the selected image forming devices, a registration request on the service providing device in response to the acceptance of the selection in the accepting step and reception of an instruction for registration;

creating, by the service providing device, location information for accessing the service providing device and that corresponds to each of the selected image forming devices;

receiving, by the information processing device, the location information from each of the selected image forming devices that have accepted the registration request;

accessing, by the information processing device, the service providing device based on the received location information, and receiving and displaying an authentication screen for inputting authentication information;

managing, by the service providing device, user information corresponding to the authentication information input on the authentication screen on the basis of the location information and each of the selected image forming devices by associating them together;

acquiring, by each of the selected image forming devices, access information for using the service providing device from the service providing device as a result of the managing step in which the user information and the image forming devices have been associated with each other and managed; and confirming, by the information processing device, whether the image forming devices have acquired the access information in the acquiring step.

11. A non-transitory storage medium on which is stored a computer program for making a computer execute a method for controlling a printing system that comprises a service providing device that provides a print service, an image forming device that executes printing by utilizing the service providing device, and an information processing device that is communicable with the image forming device and the service providing device, comprising:

accepting, by the information processing device, a selection of at least one or more image forming device that are targets to be registered from among a plurality of image forming devices;

transmitting, by the information processing device, to each of the selected image forming devices, a registration request on the service providing device in response to the acceptance of the selection in the accepting step and reception of an instruction for registration;

creating, by the service providing device, location information for accessing the service providing device and that corresponds to each of the selected image forming devices;

receiving, by the information processing device, the location information from each of the selected image forming devices that have accepted the registration request;

accessing, by the information processing device, the service providing device based on the received location information, and receiving and displaying an authentication screen for inputting authentication information;

managing, by the service providing device, user information corresponding to the authentication information input on the authentication screen on the basis of the location information and each of the selected image forming devices by associating them together;

acquiring, by each of the selected image forming devices, access information for using the service providing device from the service providing device as a result of the managing step in which the user information and each of the selected image forming devices have been associated with each other and managed; and confirming, by the information processing device, whether each of the selected image forming devices have acquired the access information in the acquiring step.

\* \* \* \* \*